(12) United States Patent
Cho et al.

(10) Patent No.: US 6,800,381 B2
(45) Date of Patent: Oct. 5, 2004

(54) FLUORENE COMPOUND, POLYMERS THEREOF HAVING A POLYPHENYLENE GROUP, AND EL ELEMENT COMPRISING THE SAME

(75) Inventors: Hyun-Nam Cho, Seoul (KR); Sung Hyun Jung, Seoul (KR); Sang Won Son, Jeonju (KR); Jong Bok Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 124 days.

(21) Appl. No.: 10/271,318

(22) Filed: Oct. 14, 2002

(65) Prior Publication Data

US 2003/0099838 A1 May 29, 2003

(30) Foreign Application Priority Data

Oct. 26, 2001 (KR) ........................................ 2001-66330

(51) Int. Cl.[7] .......................... H05B 33/00; C08G 63/00
(52) U.S. Cl. ........................ 428/690; 428/917; 313/504; 313/507; 528/86
(58) Field of Search ............................... 428/690, 917; 313/504, 507; 528/86

(56) References Cited

U.S. PATENT DOCUMENTS 5,807,974 A * 9/1998 Kim et al. ................... 528/366
5,876,864 A * 3/1999 Kim et al. ................... 428/690

OTHER PUBLICATIONS

J.K. Stille, et al., "Diels–Alder Polymerizations: Polymers Containing Controlled Aromatic Segments", Polymer Letters, vol. 4, (1966), pp. 791–793.

W. Wrasidlo, et al., "Preparation of Poly(Octaphenyl–Tetraphenylene)", Polymer Letters, vol. 7, (1969), pp. 519–523.

H. Mukamal, et al., "Diels–Adler Polymers. III. Polymers Containing Phenylated Phenylene Units", Journal of Polymer Science Part A–1, vol. 5, (1967), pp. 2721–2729.

Michael A. Ogliaruso and Ernest I. Becker., Bistetracyclones and Bishexaphenylbenzenes. II, vol. 30, Oct. 1965, pp. 3354–3360.

Michael A. Gliaruso, et al., "Bistetracyclones" and "Bishexaphenylbenzenes", Bistetracyclones, Oct. 1963, vol. 28, pp. 2725–2728.

Brodyck J.L. Royles and David M. Smith, "The 'Inverse Electron–demand' Diels–Alder Reaction in Polymer Synthesis, Part 1. A Convenient Synthetic Route to Diethynyl Aromatic Compounds", J. Chem. Soc. Perkin Trans., 1994, pp. 355–358.

Uday Kumar, et al., "Diels–Alder Polymerization between Bis(cyclopentadienones) and Acetylenes. A Versatile Route to New Highly Aromatic Polymers", Macromolecules, 1995, 28, pp. 124–130.

Zinalda B. Shifrina, et al., "Branched Polyphenylenes by Repetitive Diels–Alder Cycloaddition", Macromolecules, 2000, 33, 3525–3529.

D. Y. Kim et al., "Blue light emitting polymers", Prog. Polym. Sci. 25 (2000) 1089–1139.

(List continued on next page.)

*Primary Examiner*—Duc Truong
(74) *Attorney, Agent, or Firm*—Darby & Darby

(57) ABSTRACT

A fluorene compound and polymers thereof having a polyphenylene group, and EL element comprising the same, which can be prepared through a Diels-Alder reaction of a compound having one or more cyclopentadienone group and a compound having one or more acetylene group and can be used as a core material for organic and polymeric EL element and/or other optical devices.

13 Claims, 3 Drawing Sheets

OTHER PUBLICATIONS

Figure 1:
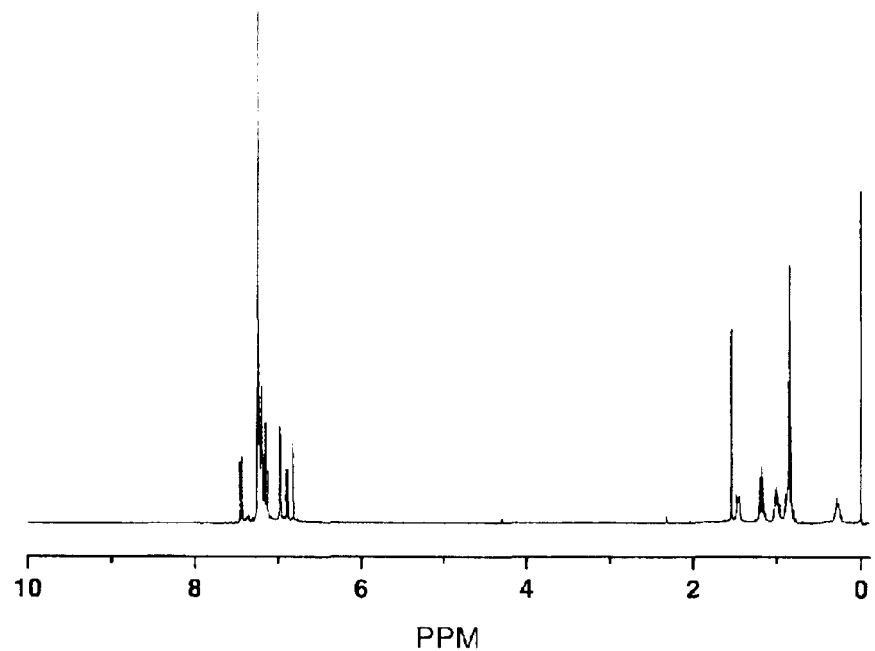

Katsumi Yoshino, et al., "Gel chromism and anomalous luminescence in poly(3–alkylthiophene)", Synthetic Metals, 45–50 (1992) 491–497.
Gabriele Grem, et al., "Realization•of•a–Blue–Light–Emitting Device Using Poly(p–phenylene)", Advanced Mater: 4 (1992), No. 1, pp. 36–37.
Amo Kraft, et al., "Electroluminescent Conjugated Polymers—Seeing Polymers in a new Light", Angew. Chem. Int. Ed. 1998, 37, pp. 402–428.
Mark T. Bemius, et al., "Progress with Light–Emitting Polymers", Advanced Mater. 2000, 12, No. 23, Dec. 1, pp. 1737–1750.
C. Zhang, et al., Blue electroluminescent diodes utilizing blends of poly(p–phenylphenylene vinylene) in poly (9–vinylcarbazole), Synthetic Metals, 62 (1994), pp. 35–40.
M.R. Andersson, et al., "Electroluminescence from Substituted Poly(thiophenes): From Blue to Near–Infrared", Macromolecules, 1995, 28, pp. 7525–7529.
M. Moroni, et al., "Rigid Rod Conjugated Polymers for Nonlinear Optics. 1. Characterization and Linear Optical Properties of Poly(aryleneethynylene) Derivatives", Macromolecules, 1994, 27, pp. 562–571.
Christoph Weder, et al., "Efficient Solid–State Photoluminescence in New Poly(2,5–dialkoxy–p–phenyleneethynylene)s", Macromolecules, vol. 29, No. 15, 1996, pp. 5157–5165.
Christoph Weder et al., "Incorporation of Photoluminescent Polarizers Into Liquid Crystal Displays", Science, vol. 279, Feb. 1998, pp. 835–837.
Kevin A. Bunten et al., "Synthesis, Optical Absorption, Fluorescence, Quantum Efficiency, and Electrical Conductivity Studies of Pyridine/Pyridinlum Dialkynyl Organic and Pt(II)–o–Acetylide Monomers and Polymers", Macromolecules, 1996, 29, pp. 2885–2893.
Gerrit Klamer, et al., "Colorfast Blue–Light–Emitting Random Copolymers Derived from Di–n–hexylfluorene and Anthracene", Adv. Mater. 1998, vol. 10, No. 13, pp. 993–997.
Hyun Nam Cho, et al., "Blue and Green Light Emission from New Soluble Alternating Copolymers", Adv. Mater. 1997, vol. 9, No. 4, pp. 326–328.
Gabriele Grem, et al., "Realization of a Blue–Light–Emitting Device using Poly(p–phenylene)", Adv. Mater., (1992), vol. 4, No. 1, pp. 36–37.
James M. Tour, "Soluble Oligo–and Polyphenylenes", Adv. Mater. (1994), vol. 6, No. 3, pp. 190–198.
R.H. Friend, et al., "Electroluminescence in conjugated polymers", Nature, Jan. 1999, vol. 397, pp. 121–128.
Markus Gross, et al., "Improving the performance of doped p–conjugated polymers for use in organic light–emitting diodes", Nature, vol. 405, Jun. 2000, pp. 661–664.
Andrew P. Davey, et al., "New Rigid Backbone Conjugated Organic Polymers with Large Fluorescence Quantum Yields", J. Chem. Soc., Chem. Commun., 1995, pp. 1433–1434.
Michael Inbasekaran, et al., "Fluorene homopolymers and copolymers", Synthetic etals, 111–112 (2000), pp. 397–401.
I. Levesque, et al., "Organic tunable electroluminescent diodes from polyfluorene derivatives", Synthetic Metals, 122 (2001), pp. 79–81.
J.M. Hong, et al., "Synthesis and Luminescence Studies of Poly(fluorenylene ethynylene)s", Synthetic Metals, 102 (1999), pp. 933–934.
H.N. Cho et al., "Synthesis and luminescent characteristics of fluorene–based polymers containing diacetylene unit", Synthetic Metals 111–112 (2000), pp. 429–431.
J.B. Kim, et al., "Novel fluorene–based polymers containing acetylene units", Synthetic Metals 119 (2001) pp. 105–106.
H.N. Cho, et al., "Statistical Copolymers for Blue–Light–Emitting Diodes", Macromolecules, 1999, vol. 32, pp. 1476–1481.
Hubert Spreitzer, et al., "Soluble Phenyl–Substituted PPVs–New Materials for Hightly Efficient Polymer LEDs", Adv. Mater., 1998, vol. 10, No. 16, pp. 1340–1343.
Michael A. Ogliaruso, et al., "Chemical Reviews" vol. 65, No. 3, May 1965, pp. 261–367.

* cited by examiner

FLUORENE COMPOUND, POLYMERS THEREOF HAVING A POLYPHENYLENE GROUP, AND EL ELEMENT COMPRISING THE SAME

BACKGROUND OF THE INVENTION

1. Field of the Invention

The present invention relates to a novel fluorene compound and polymers thereof having a polyphenylene group which can be used as an organic polymer semiconductor and optical electronic material, and especially an electroluminescence (referred to as 'EL', hereinafter) material, and to an EL element comprising the same.

2. Description of the Background Art

Polyphenylenevinylene (referred to as 'PPV', hereinafter), polythiophene (referred to as 'PTh', hereinafter) and polyphenylene group polymers (*Synth. Met.*, 50(1–3), p491 (1992); *Adv. Mater*, 4, p36 (1992); *Adv Mater*, 6, p190 (1994); and *Chem. Rev*, 99, p1747 (1999)) have been widely and representatively known as organic polymer semiconductor and optical electronic materials (refer to *Semiconducting Polymers: Chemistry, Physics and Engineering*, Edited by G. Hadziioannou and P. F. van Hutten, WILEY-VCH (2000)) or as polymer light-emitting materials (*Angew, Chem, Int. Ed.*, 37, p402 (1998); *Nature*, 397, p121 (1999); *Prog. Polym. Sci.*, 25, p1089 (2000); and *Adv Mater.*, 12, p1737 (2000)).

Up to now, researches have been conducted on such polymer materials, but these materials have shortcomings that final products are not dissolved in an organic solvent.

PPV or PTh derivatives which emit various lights of blue, green and red having an improved processibility by introducing a suitable substituent thereto have been known (*Synth. Met.*, 62, p35 (1994); *Adv. Mater.*, 4, p36 (1992); and *Macromolecules*, 28, p7525 (1995)), some of which exhibit an excellent processibility since they are easily dissolved in an organic solvent even though they have a large molecular weight (*Adv. Mater.*, 10, p1340 (1998)).

In addition, fluorene group polymers have lately reported frequently as one of various light-emitting materials (refer to *Jpn. J. Appl. Phys.*, 30, pL1941 (1991); *J. Polym. Sci. Polym. Chem. Ed.*, 31, p2465 (1993); *J. Am. Chem. Soc.*, 118, 7416 (1996); *Adv. Mater.*, 9, p326 (1997); *Adv. Mater*, 10, p993 (1998); *Macromolecules*, 32, p1476 (1999); *Nature*, 405, p661 (2000); *Syn. Met.*, 111–112, p397 (2000); *Syn. Met.*, 122, p79 (2001) and *J. Am. Chem. Soc.*, 123, 946 (2001)).

Besides, there have been known U.S. Pat. Nos. 5,621,131, 5,708,130 and 5,900,327 which disclose fluorene group polymers having a single bond, and U.S. Pat. No. 5,807,974 which disclose a fluorene group alternate copolymer having a conjugate double bond as a light-emitting material for an EL element.

Polymers having an acetylene group have been presented as an organic polymer semiconductor and optical electronic material (refer to *Makromol. Chem.*, 191, p857 (1990); *Macromolecules*, 27, p562 (1994); *J. Chem. Soc., Chem. Commun.*, p1433 (1995); and *Macromolecules*, 29, p5157 (1996)), which are mostly related to a nonlinear optical material, a photo conductivity and photoluminescence (hereinafter referred to as 'PL'), and *Syn. Met*, 102, p933 (1999) discloses an example that they are used as an EL material. Researches into other applications have been also reported (refer to *Science*, 297, p835 (1998)).

Polymers having a diacetylene group have been reported (refer to *Prog. Polym. Sci.*, 20, p943 (1995); *CHEMTECH, October*, P32 (1993); *Macromolecules*, 29, p2885 (1996); *Syn. Met.*, 111–112, p429 (2000); and *Syn. Met*, 119, p105 (2001)). These polymers are as sensitive to heat or light as the acetylene group polymers so that they can easily cross-link, and therefore stable cross-linked polymers can be obtained.

An application of such polymer having an acetylene or diacetylene group as an EL material has been patented to the same applicants of the present invention (U.S. Pat. No. 5,876,864 and Japanese Patent No. 3,046,814). This polymer can be also applied as a nonlinear optical material, a heat resistant polymer, polarized PL polymer, and electric or optical active polymer, as well as a light-emitting material.

Meanwhile, through a Diels-Alder reaction of bis (acetylene), that is, a compound having two ethynyl groups with a compound having a bis(cyclopentadienone) group (refer to *J. Org. Chem.*, 28, p2725 (1963); *Chem. Rev.*, 65, p261 (1965); *J. Org. Chem.*, 30, p3354 (1965); and U.S. Pat. No. 4,400,540), a polyphenylene group polymer in which a plurality of phenyl groups are substituted (refer to *J. Polym. Sci.*, Part B, 4, p791 (1966); *J. Polym. Sci.*, Part A-1, 5, p2721 (1967); *J. Polym. Sci.*, Part B, 7, p519 (1969); *Macromolecules*, 5, p49 (1972); *Macromolecules*, 28, p124 (1995); *Macromolecules*, 33, p3525 (2000)) can be obtained. This polymerization is a reaction that a molecular weight is increased while carbon monoxide is removed. This polymerization is carried out at 100–400° C. without a solvent, or with a solvent selected from among toluene, diphenyl ether, o-diclorobenzene and cyclohexylbenzene, by which a polymer is obtained with a high yield of more than 80%. Since several phenyl groups are substituted in the obtained polymer, the polymer is thermally stable and easily dissolved in an organic solvent while has a high molecular weight. Accordingly, such polymer can be applied as a photoreceptor (refer to U.S. Pat. No. 5,882,829), or a dielectric substance in microelectronics industry, and especially, in the field of integrated circuits (refer to U.S. Pat. No. 5,965,679).

In addition, a polyphenylene group polymer can be obtained through an Eidls-Alder polymerization with a bis($\alpha$-pyrone) or bis(thiophene dioxide) instead of bis (cyclopentadienone) (refer to *J. Chem. Soc. Perkin Trans* 1 p355 (1994); and U.S. Pat. Nos. 2,971,944 and 2,890,207).

However, in the case of the aforementioned monomers, that is, the bis(acetylene) compound or bis (cyclopentadienone) compound, preparation cost is high and preparation procedures are difficult, and therefore, various kinds of monomers have not been provided. Especially, in the case of the bis(cyclopentadienone), its kind is so limited that polyphenylene group polymers having various properties and structures can not be prepared.

The inventors of the present invention have made constant efforts to solve the aforementioned problems in the prior art and reached the present invention. That is, the present invention provides a fluorene compound having a polyphenylene group and polymers thereof, prepared from a variety of acetylene compounds and fluorene group bis (cyclopentadienone) monomers, and the use thereof as a light-emitting material.

SUMMARY OF THE INVENTION

Therefore, an object of the present invention is to provide a variety of acetylene compounds and fluorene compounds having one or more cyclopentadienone groups.

Another object of the present invention is to provide a variety of novel fluorene compounds having a polyphenylene group and polymers thereof, prepared from the above acetylene compounds and fluorene compounds having one or more cyclopentadienone groups, in which their structures can be identified, and which can be dissolved in an organic solvent and can be used as an EL material and other optical electronic materials.

Another object of the present invention is to provide an EL element using the fluorene compound or polymer thereof as a light-emitting material.

DETAILED DESCRIPTION OF THE INVENTION

A fluorene compound and polymers thereof according to the present invention can be represented by the following formula (1):

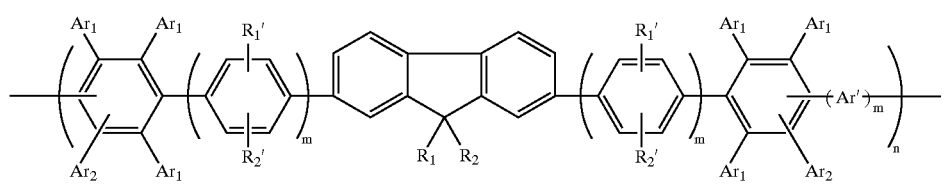

(1)

In formula (1), $R_1$, $R_2$, $R_1'$ and $R_2'$ are the same with each other or different from each other, and respectively represent a hydrogen atom, $C_1$–$C_{22}$ aliphatic or cyclo-alkyl, or alkoxy group, or $C_6$–$C_{18}$ aryl or aryloxy group. More specifically, they may be independently a hydrogen atom, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, docodecyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphthyl or anthrancene, or a derivative thereof. They also may include an alkyl or aryl derivative containing silicon, tin or germanium, or a halogen atom. Examples of such substituent may include trimethylsilyl, triphenylsilyl, tributyltin, triethylgermanium, and a halogen atom such as iodine, bromine and chlrorine.

In formula (1), $Ar_1$ and $Ar_2$ can be the same with or different from each other, and respectively may represent a hydrogen atom, trimethylsilyl, bromine and/or an alkyl group as in the $R_1$, $R_2$, $R_1'$ and $R_2'$. They mainly represent an aromatic substituent having 6 to 18 carbon atoms, respectively, such as phenyl, naphtyl and derivatives thereof.

In formula (1), Ar' is an aromatic or heterocyclic group such as phenylenyl, naphthalenyl, anthracenyl, fluorenyl, thiopenyl, pyrrolyl, pyridinyl, aryloxadiazolyl, triazolyl, carbazolyl, arylamino, arylsilanyl and derivatives thereof, but not limited thereto. Especially preferable examples of the Ar' include the following substituents:

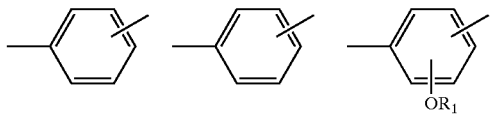

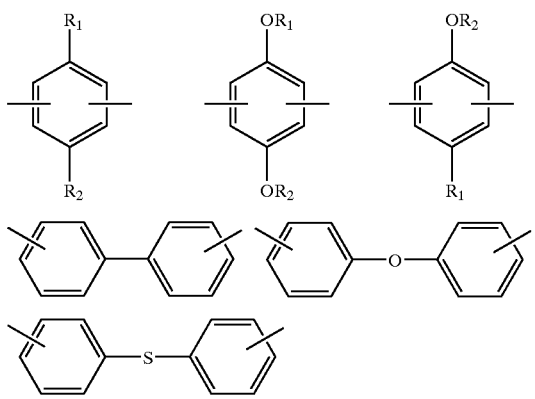

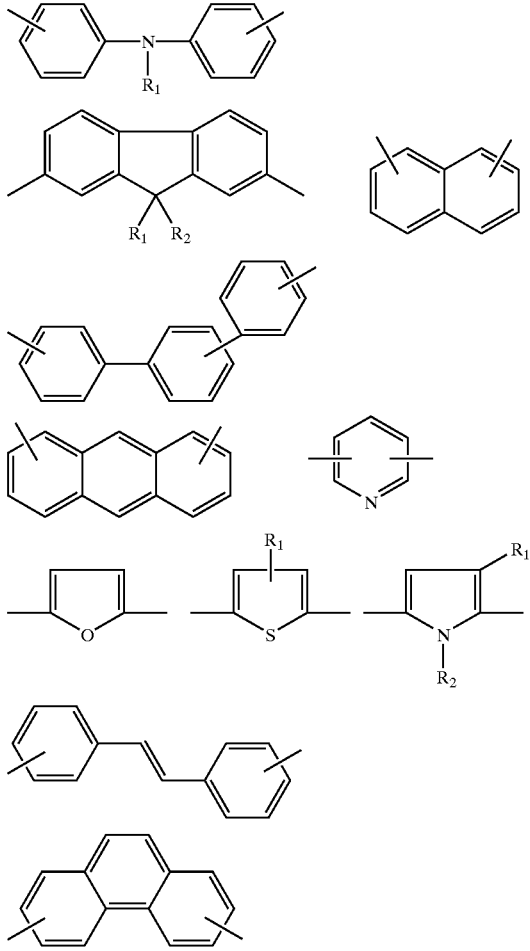

-continued

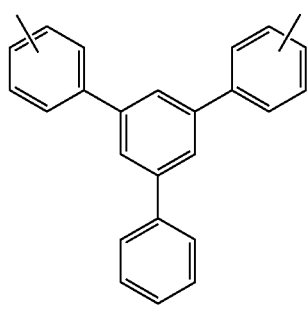
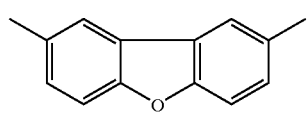
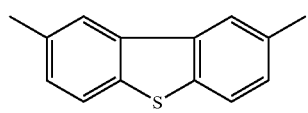
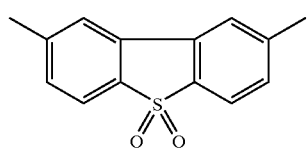
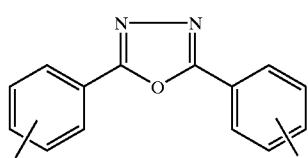
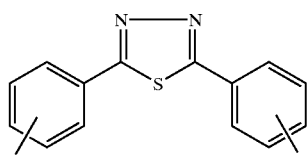
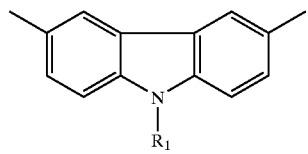
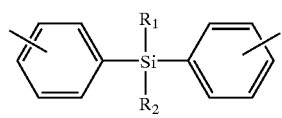

-continued

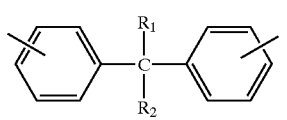
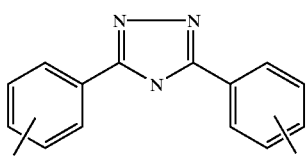
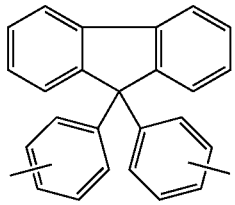

$R_1$ and $R_2$ as shown in the structures of Ar' are the same groups as defined above.

In formula (1), m is 0 or an integer of above 1, and n is an integer of above 1.

The fluorene compound and polymers thereof of the present invention include a reaction or polymerization product (homopolymer) between the same fluorene compounds of the present invention, a reaction or polymerization product (copolymer) between fluorene compounds of the present invention which are different from each other, and a reaction or polymerization product between the fluorene compound of the present invention and other organic compound.

The kinds of the compounds and polymers thereof in accordance with the present invention are not specially limited, and any compounds and polymers thereof can be used so long as it can be easily prepared and has excellent EL properties.

The fluorene compound in accordance with the present invention can be prepared by a method as shown in the following reaction schemes 1 to 3:

Reaction Scheme 1

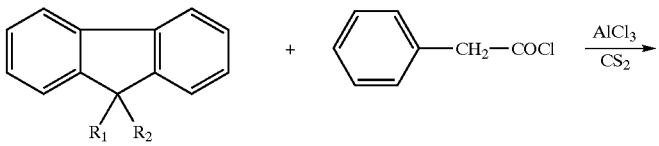

-continued
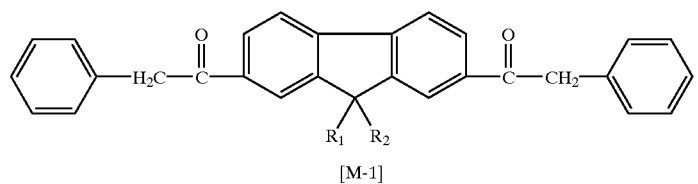
[M-1]
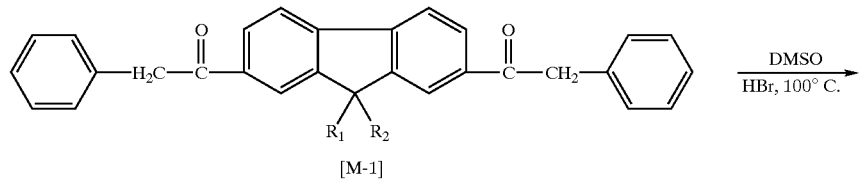
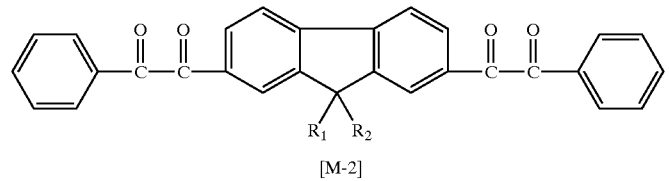
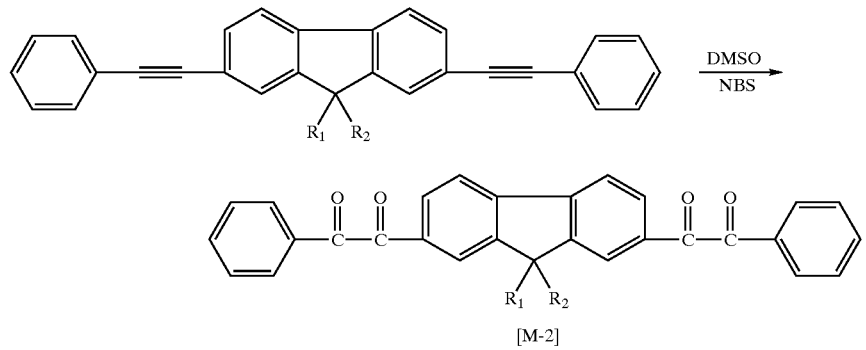
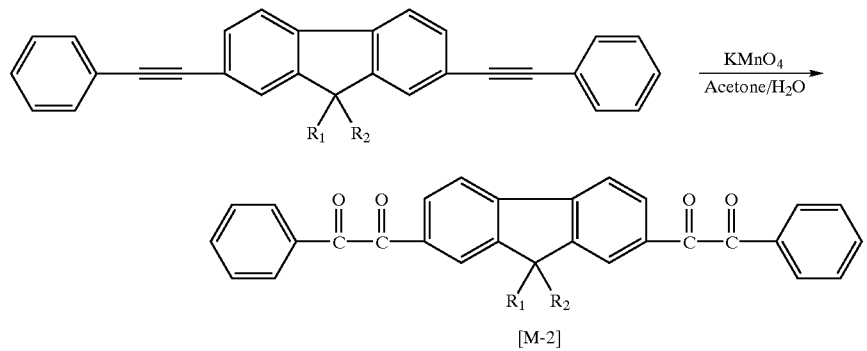
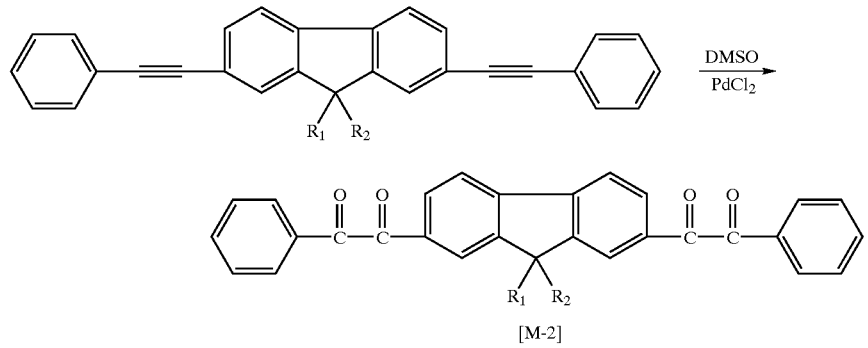

Reaction Scheme 2
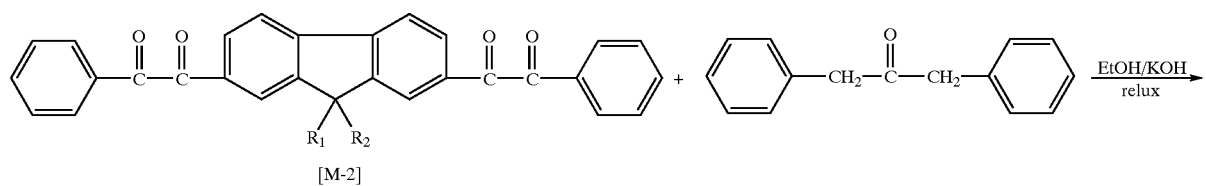
[M-2]
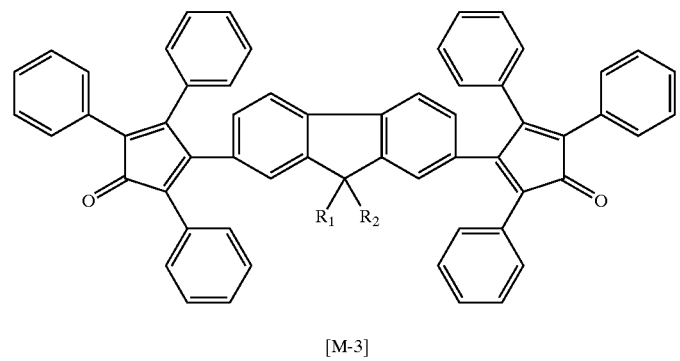
[M-3]
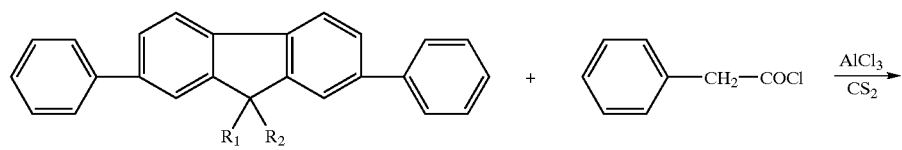
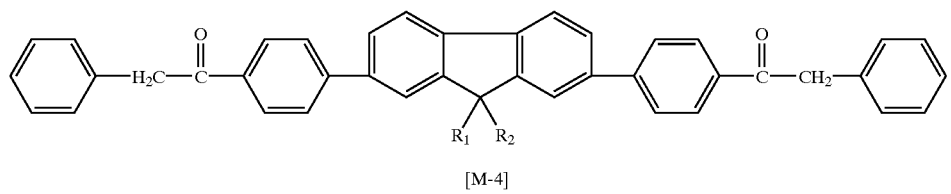
[M-4]
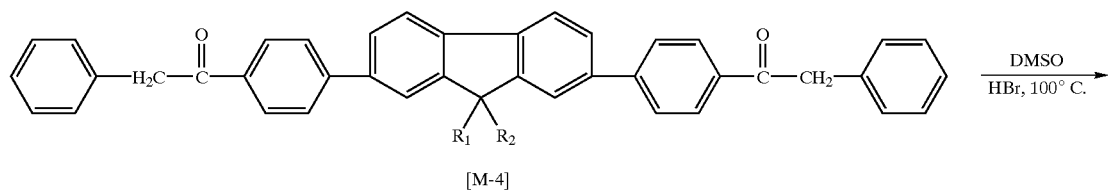
[M-4]
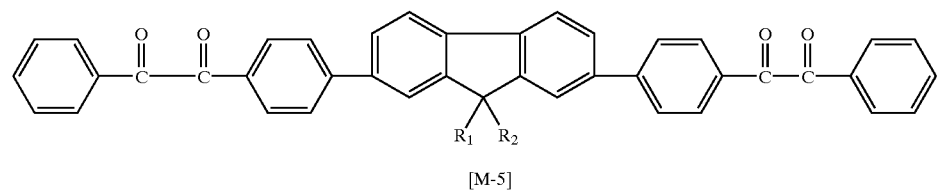
[M-5]

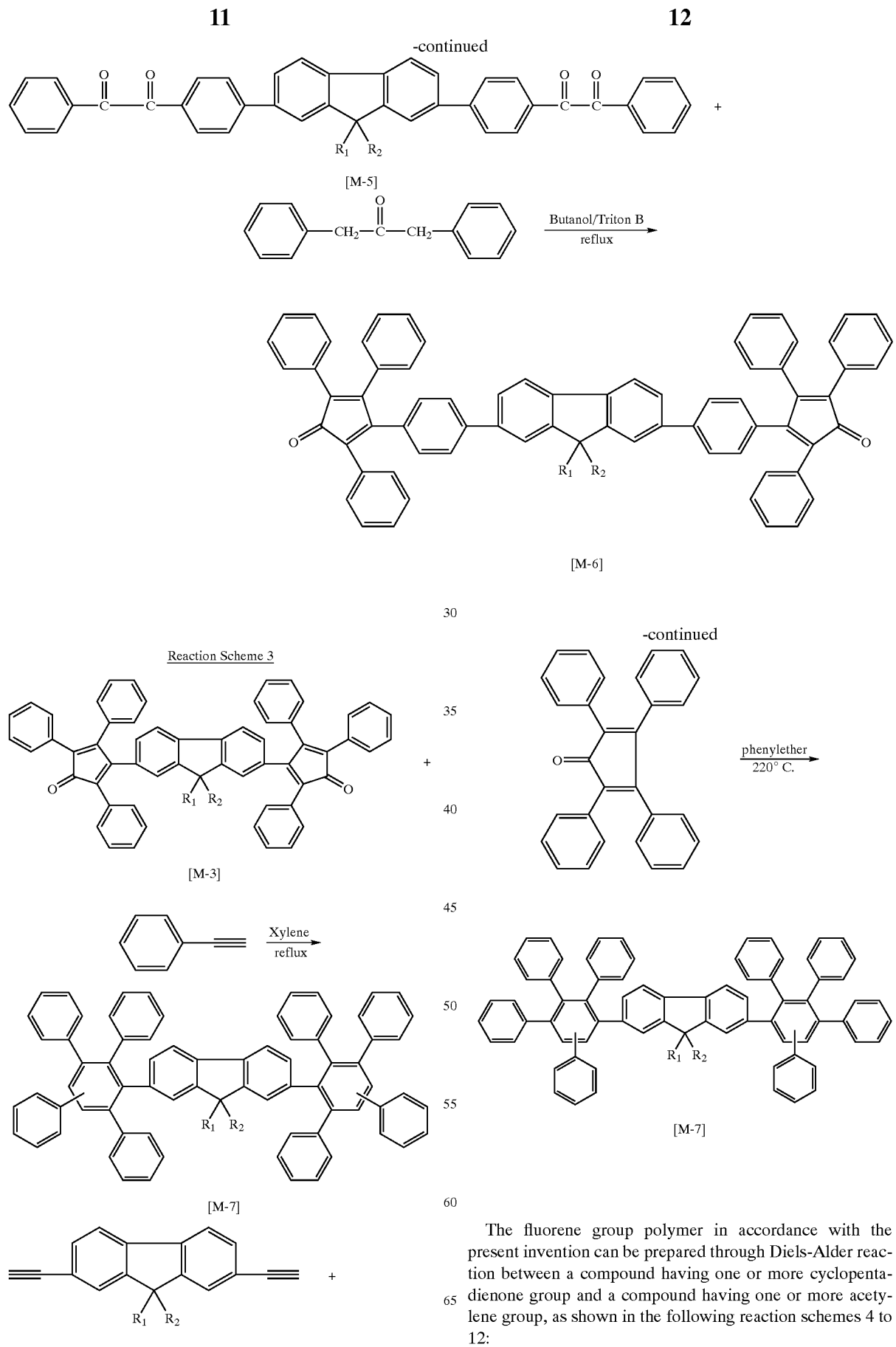
The fluorene group polymer in accordance with the present invention can be prepared through Diels-Alder reaction between a compound having one or more cyclopentadienone group and a compound having one or more acetylene group, as shown in the following reaction schemes 4 to 12:

Reaction Scheme 4
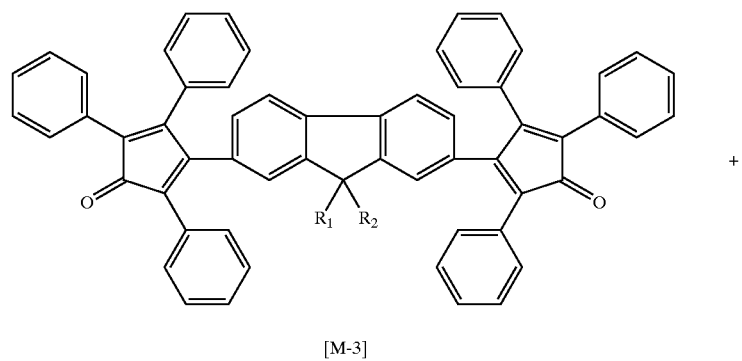
[M-3]
+
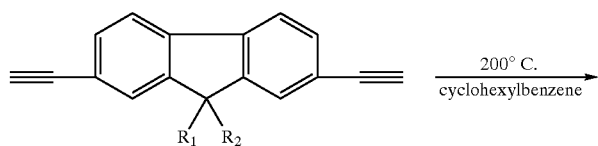
→ 200° C. cyclohexylbenzene
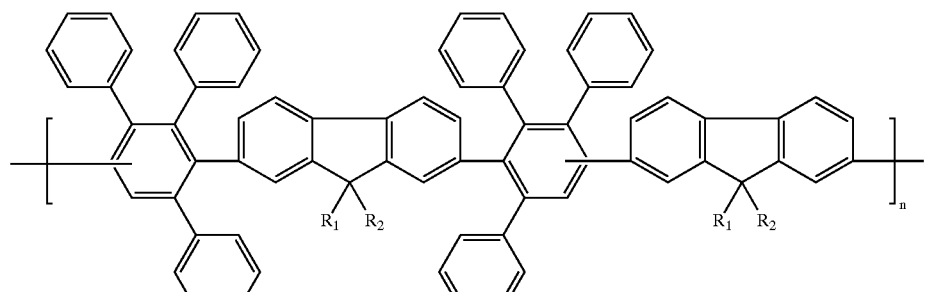
[P-1]
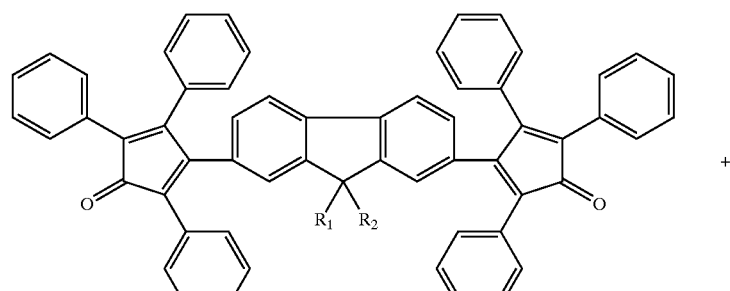
[M-3]
+
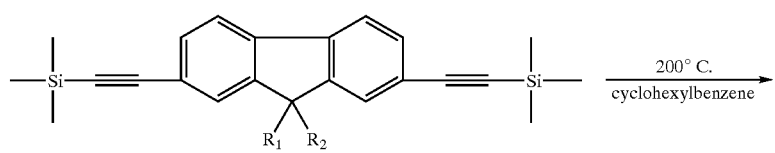
→ 200° C. cyclohexylbenzene

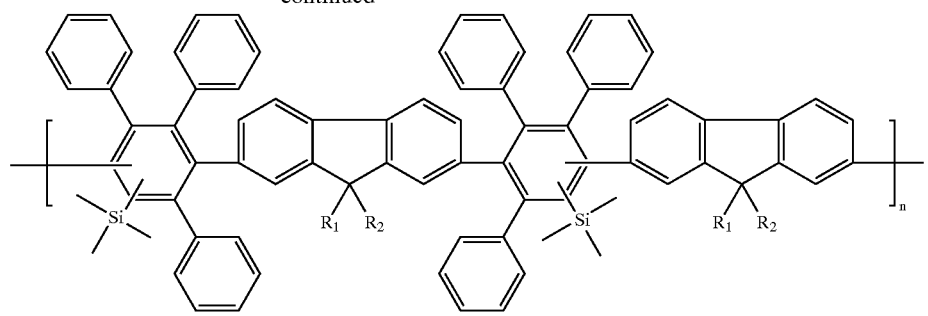
[P-2]
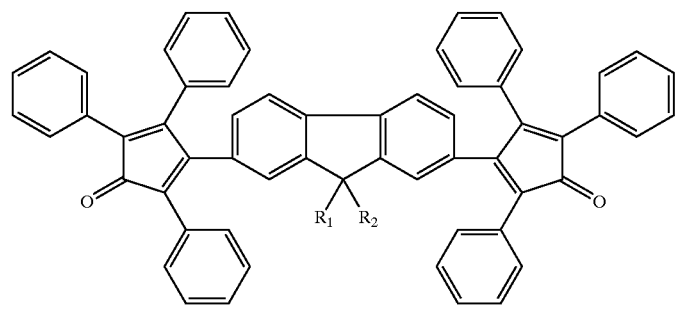
[M-3]
+
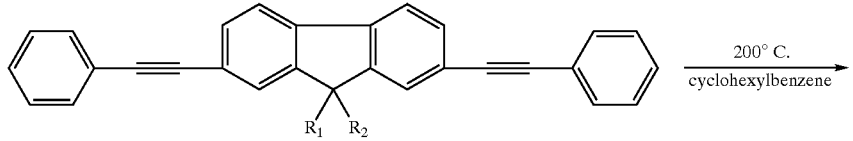
$\xrightarrow{\text{200° C.}}_{\text{cyclohexylbenzene}}$
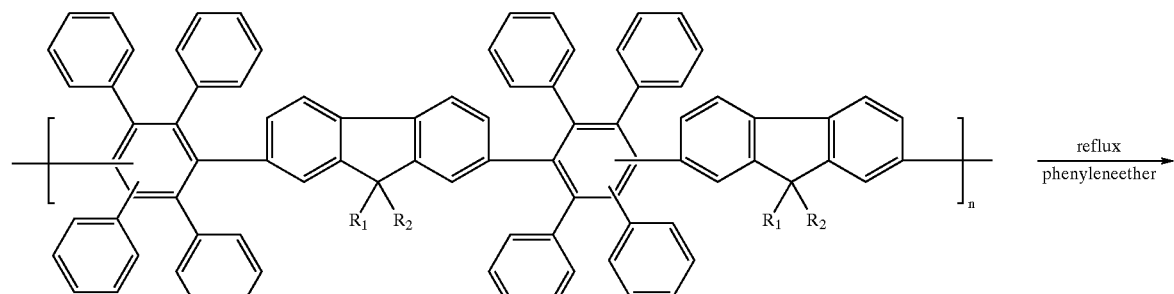
[P-3]
$\xrightarrow{\text{reflux}}_{\text{phenyleneether}}$
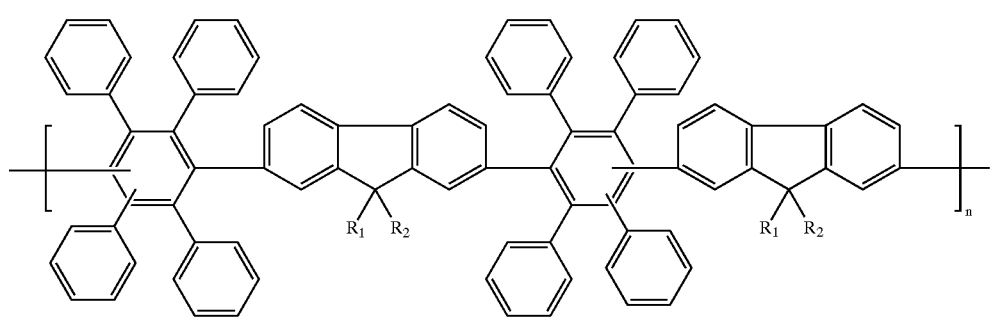
[P-3]

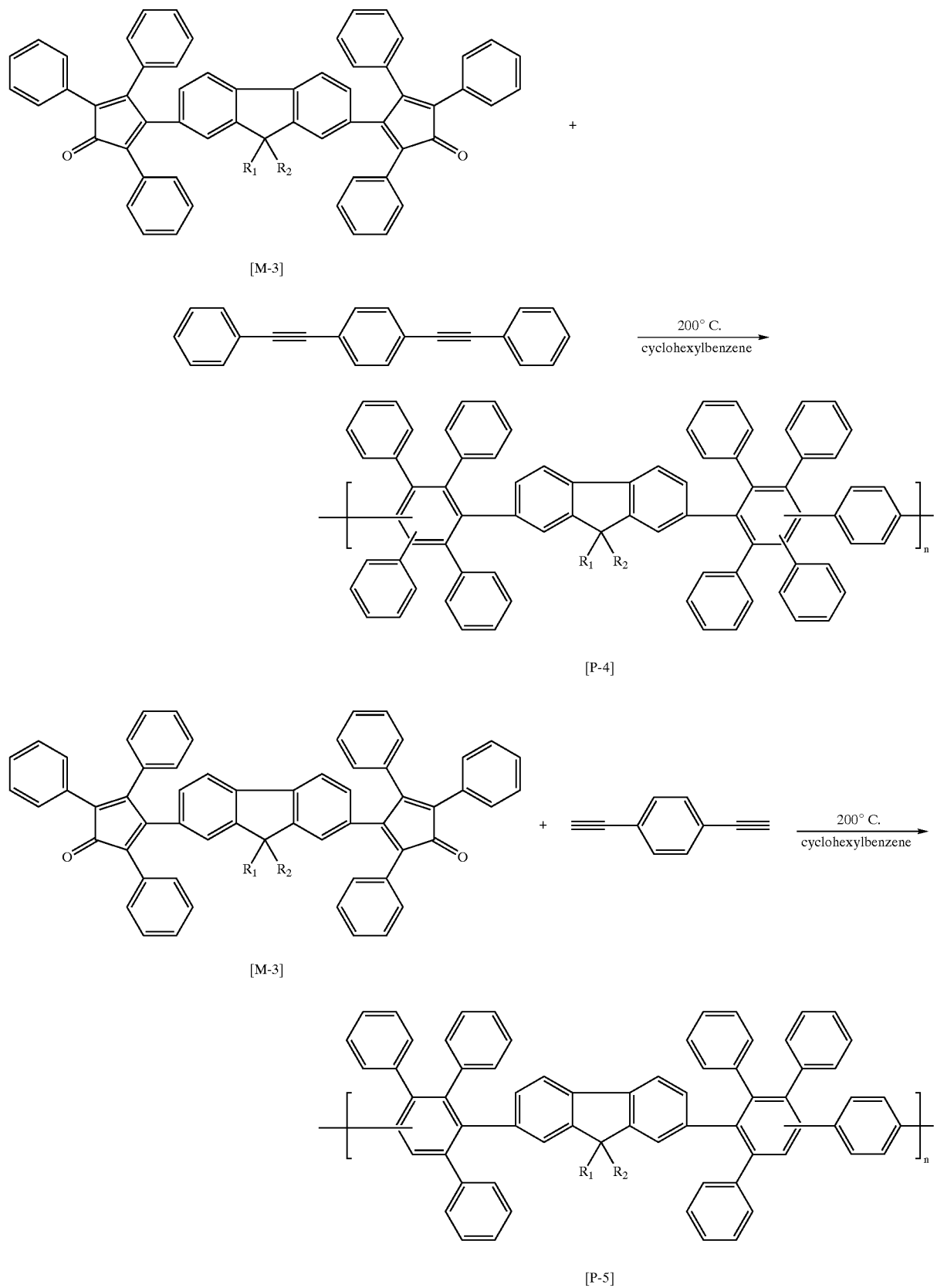

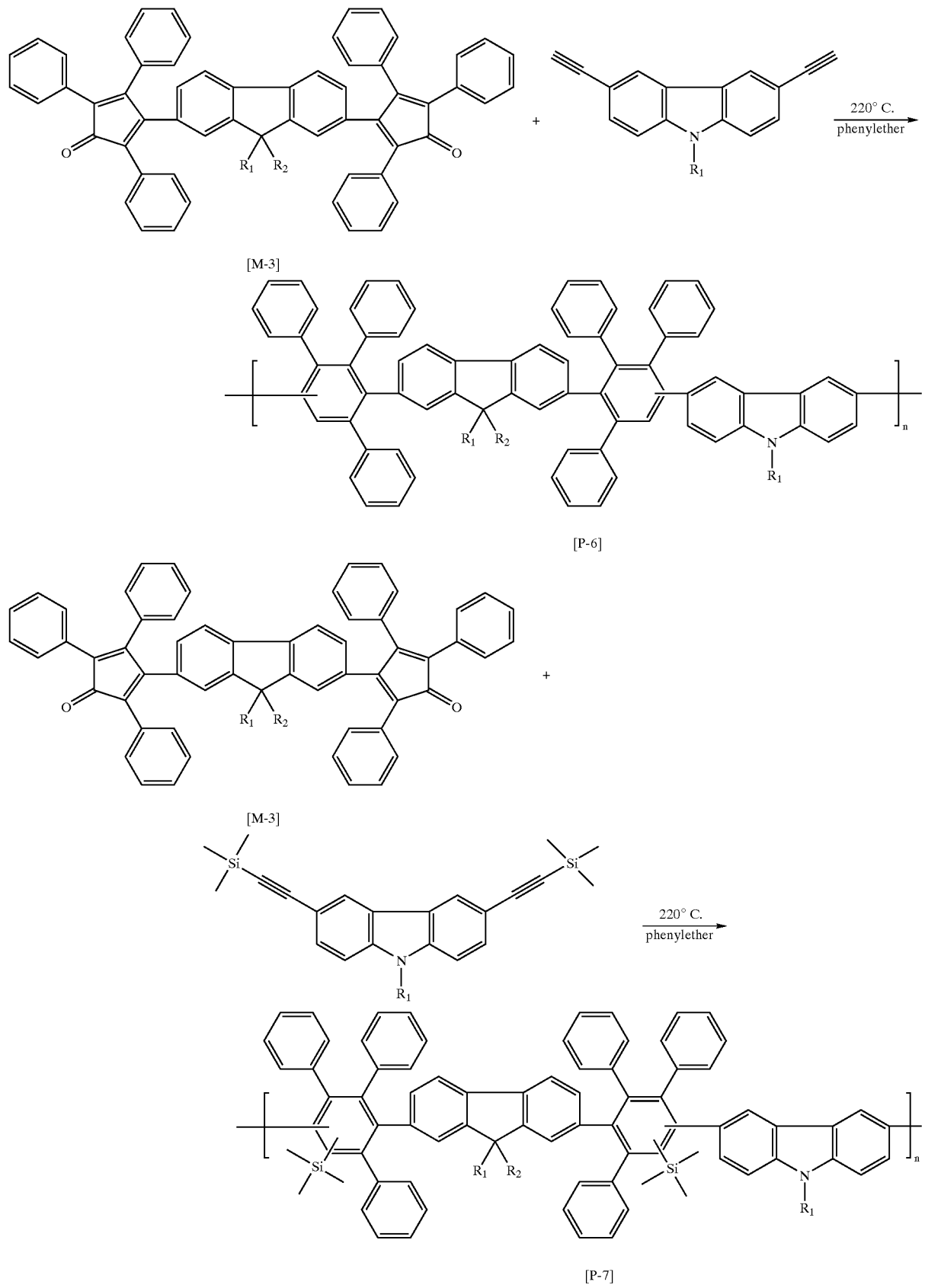

-continued
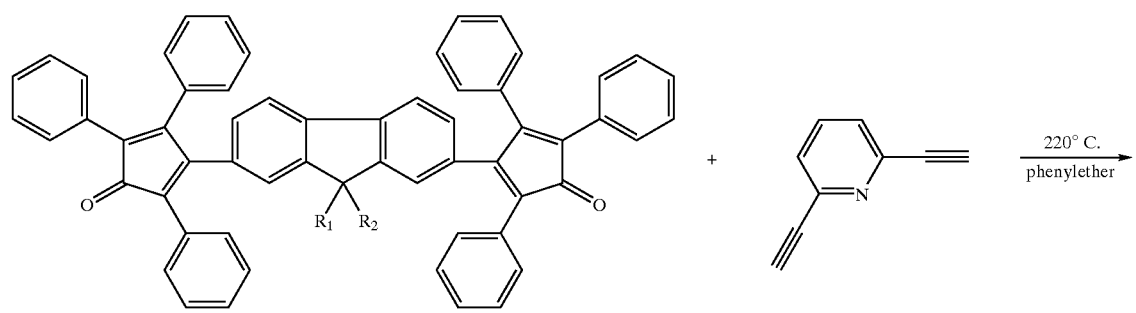
[M-3]
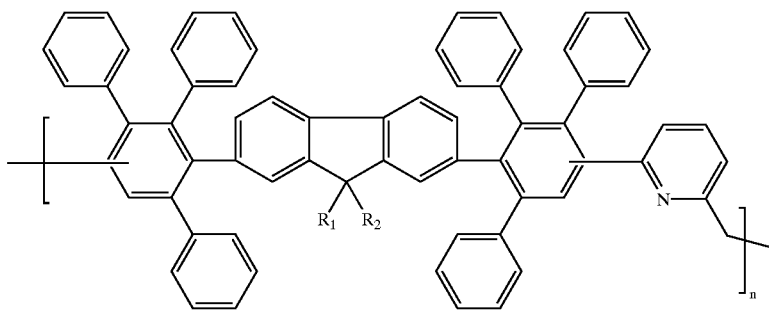
[P-8]
Reaction Scheme 7
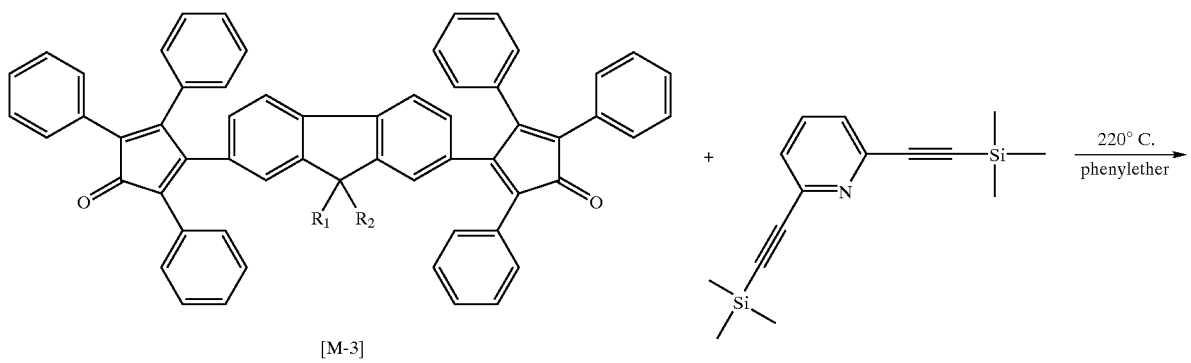
[M-3]
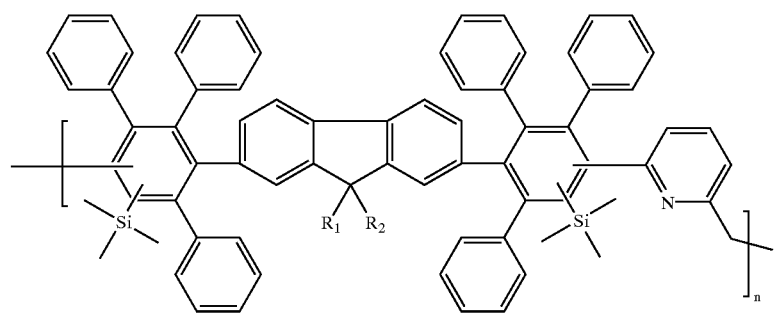
[P-9]

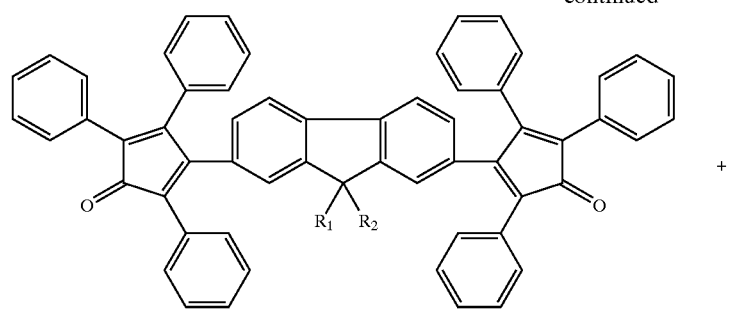
[M-3]
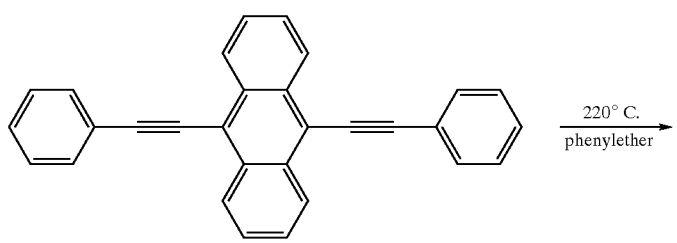
$\xrightarrow{\text{220° C.}}_{\text{phenylether}}$
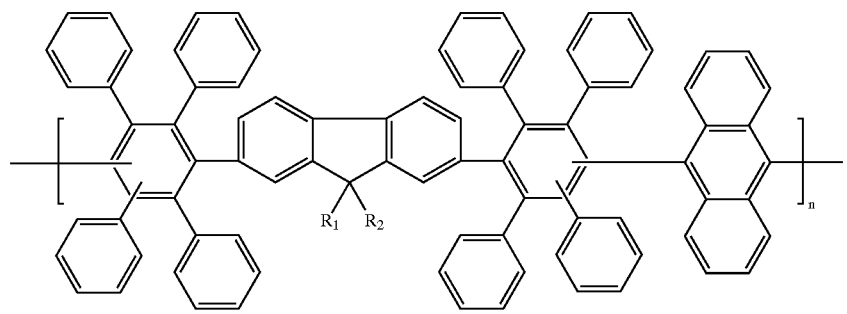
[P-10]
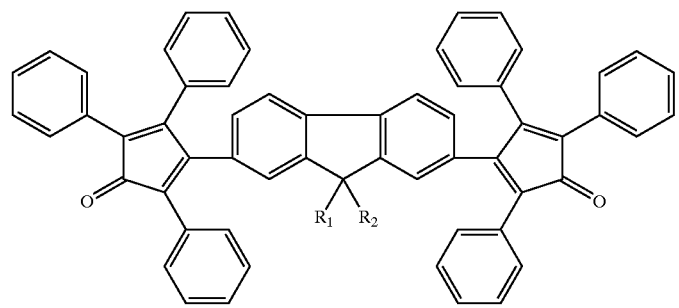
[M-3]
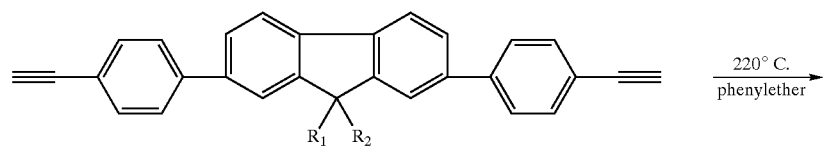
$\xrightarrow{\text{220° C.}}_{\text{phenylether}}$

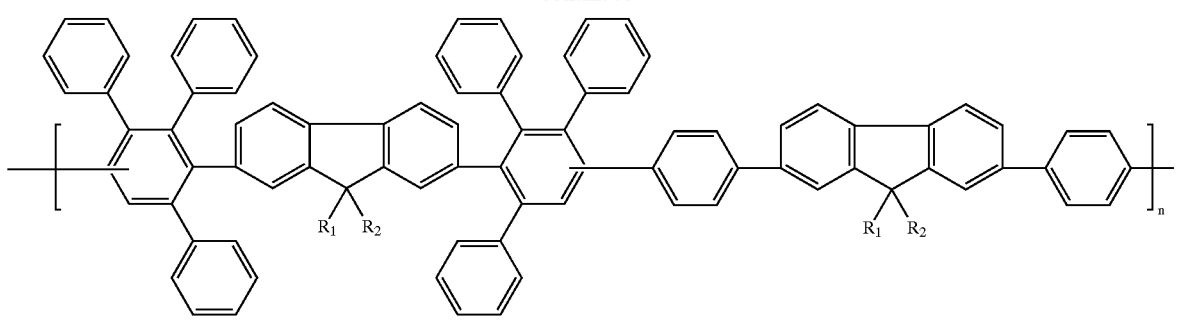
[P-11]
Reaction Scheme 8
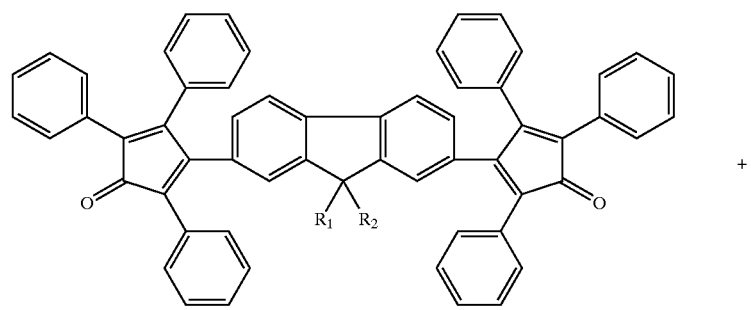
[M-3]
+
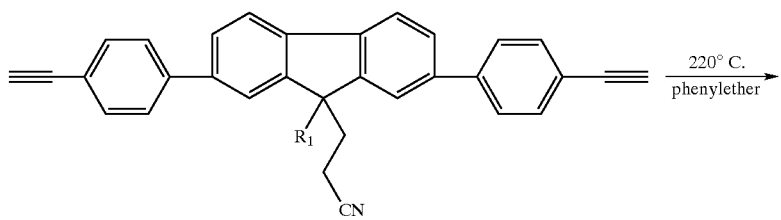
$\xrightarrow{\text{220° C.}}_{\text{phenylether}}$
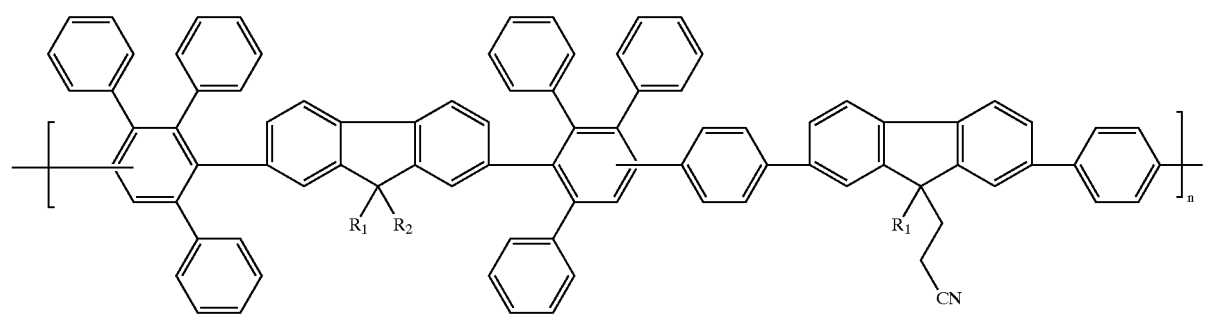
[P-12]

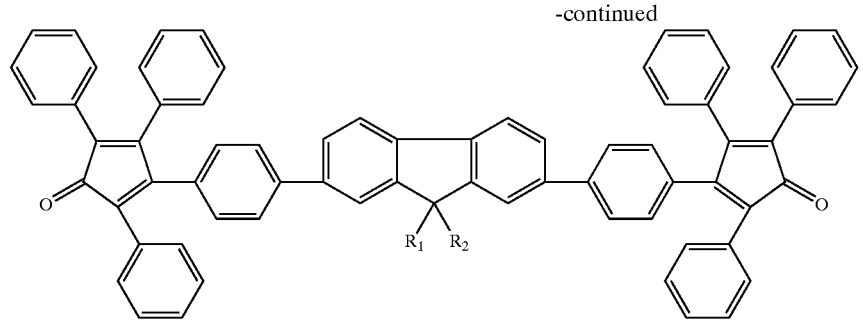
[M-6]
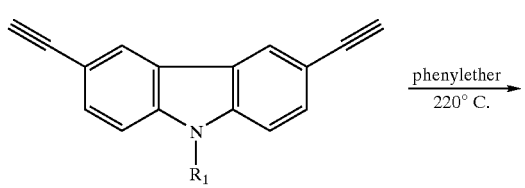
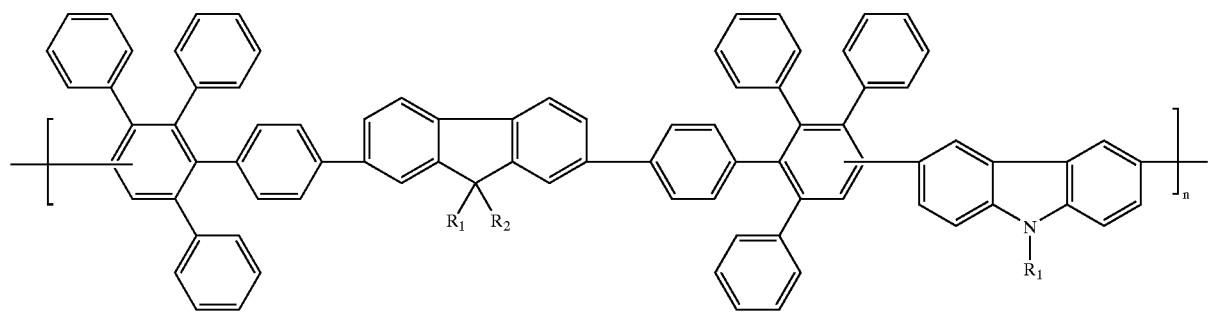
[P-13]

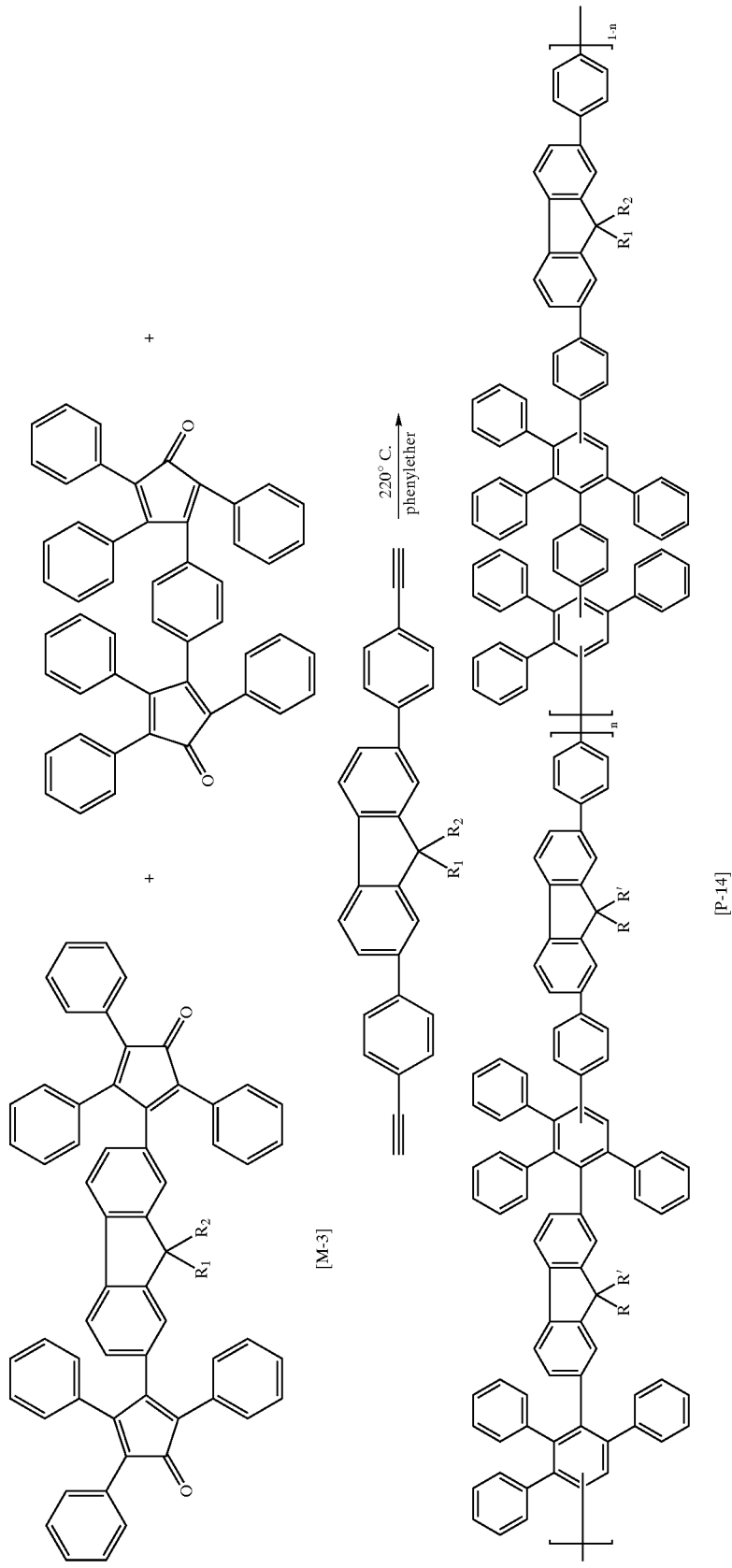

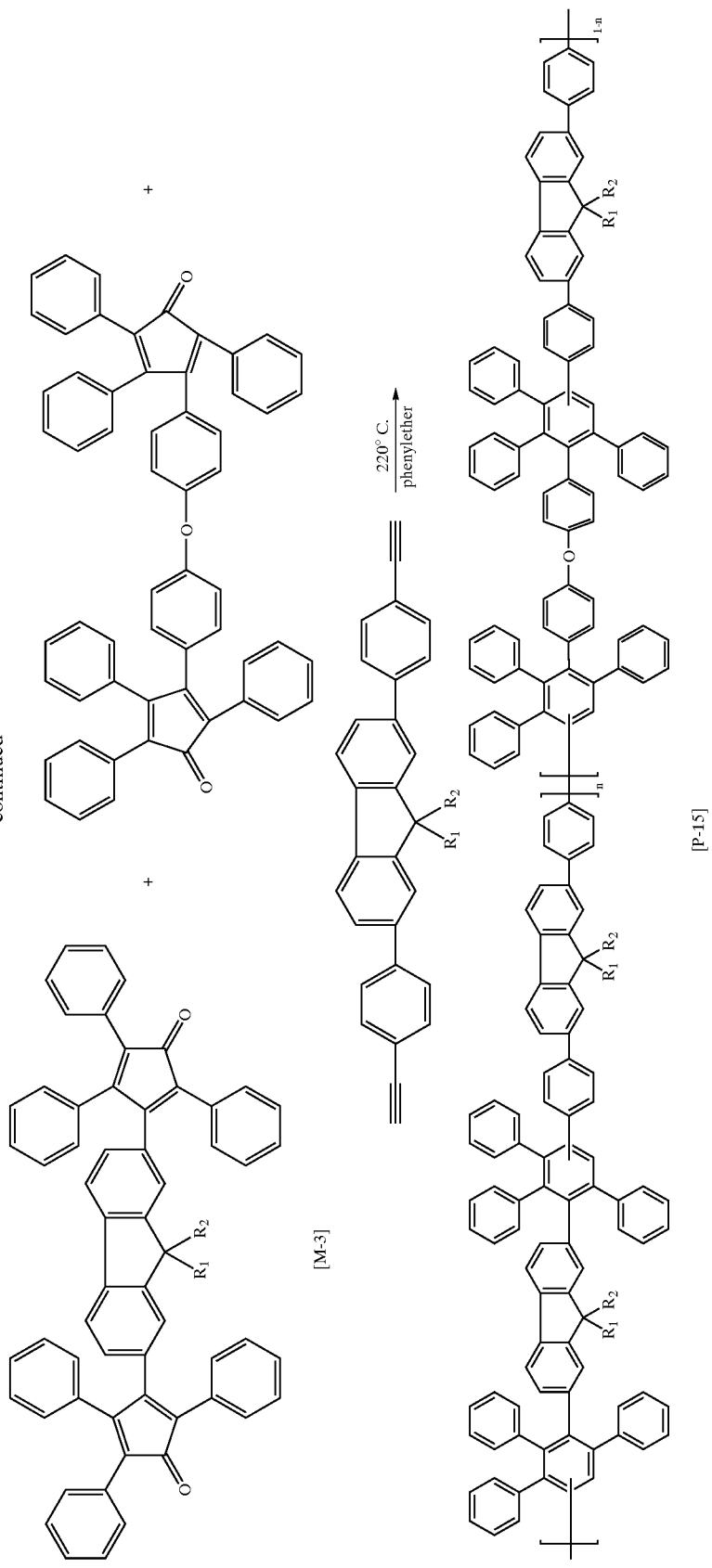

Reaction Scheme 10
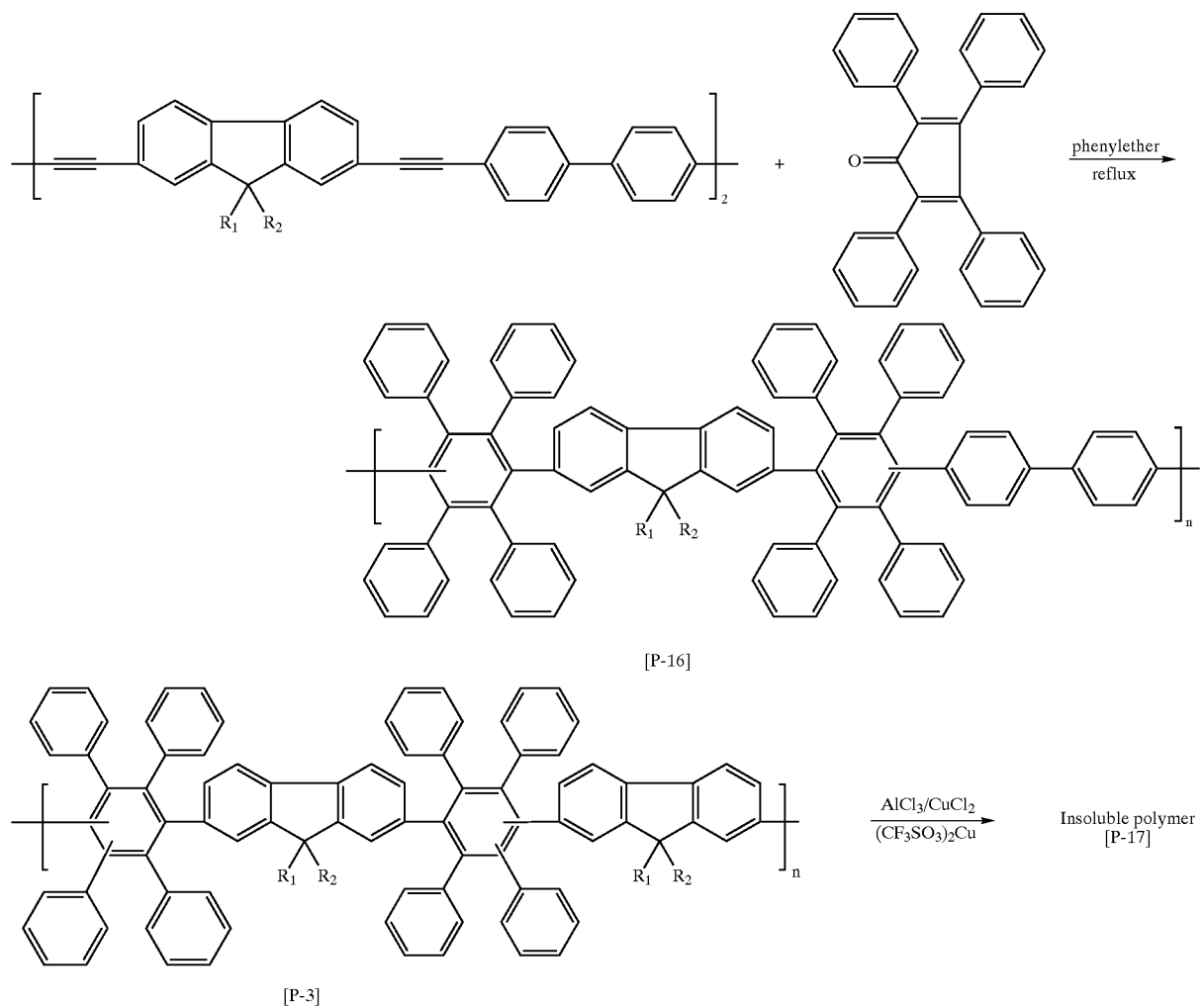
[P-16]
[P-3]
Reaction Scheme 11
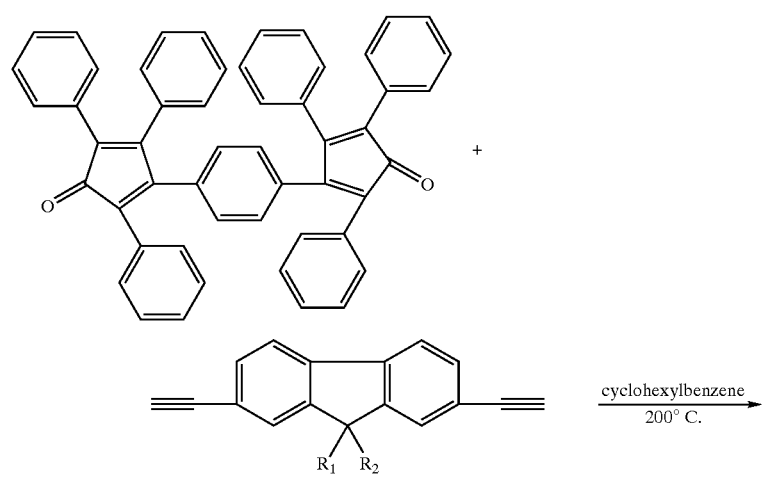

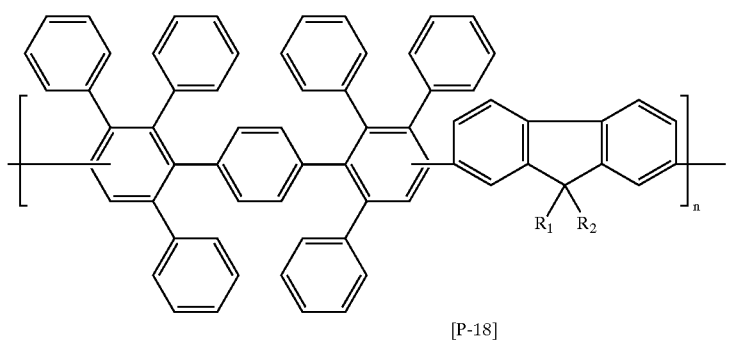
[P-18]
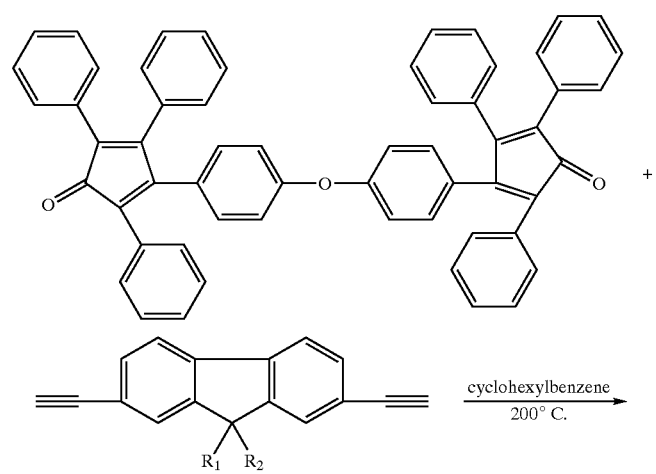
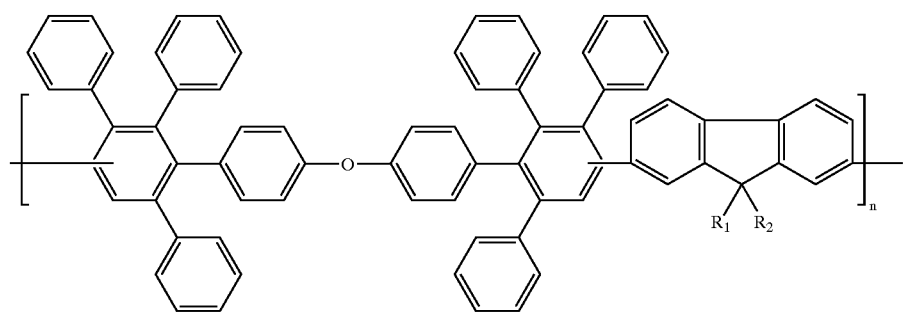
[P-19]
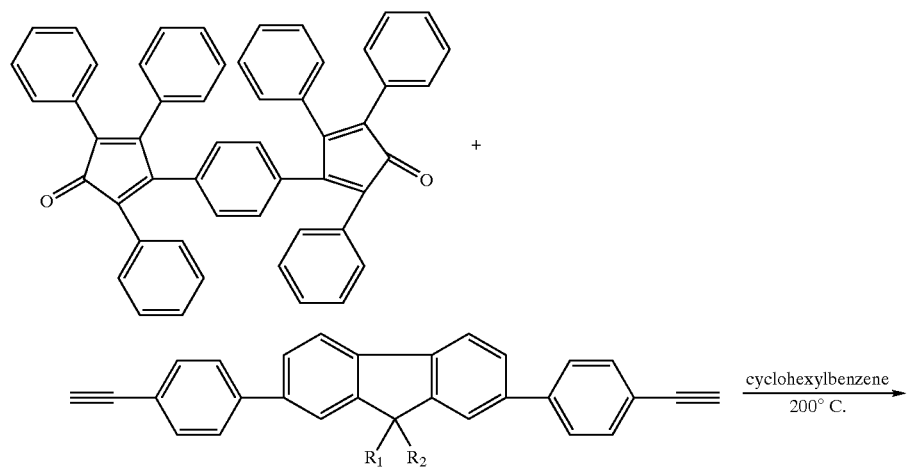

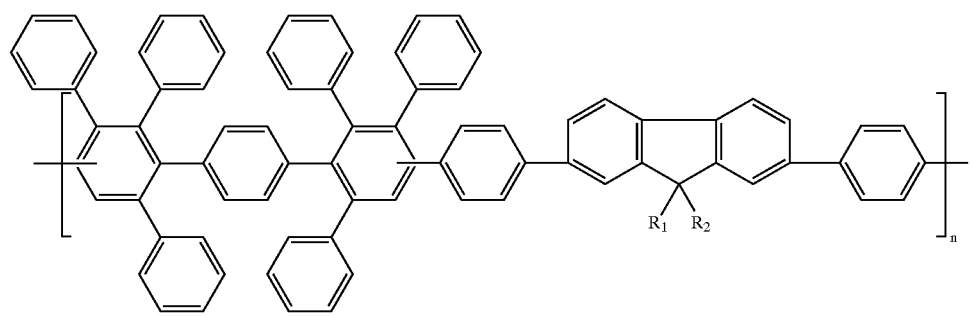
[P-20]
Reaction Scheme 12
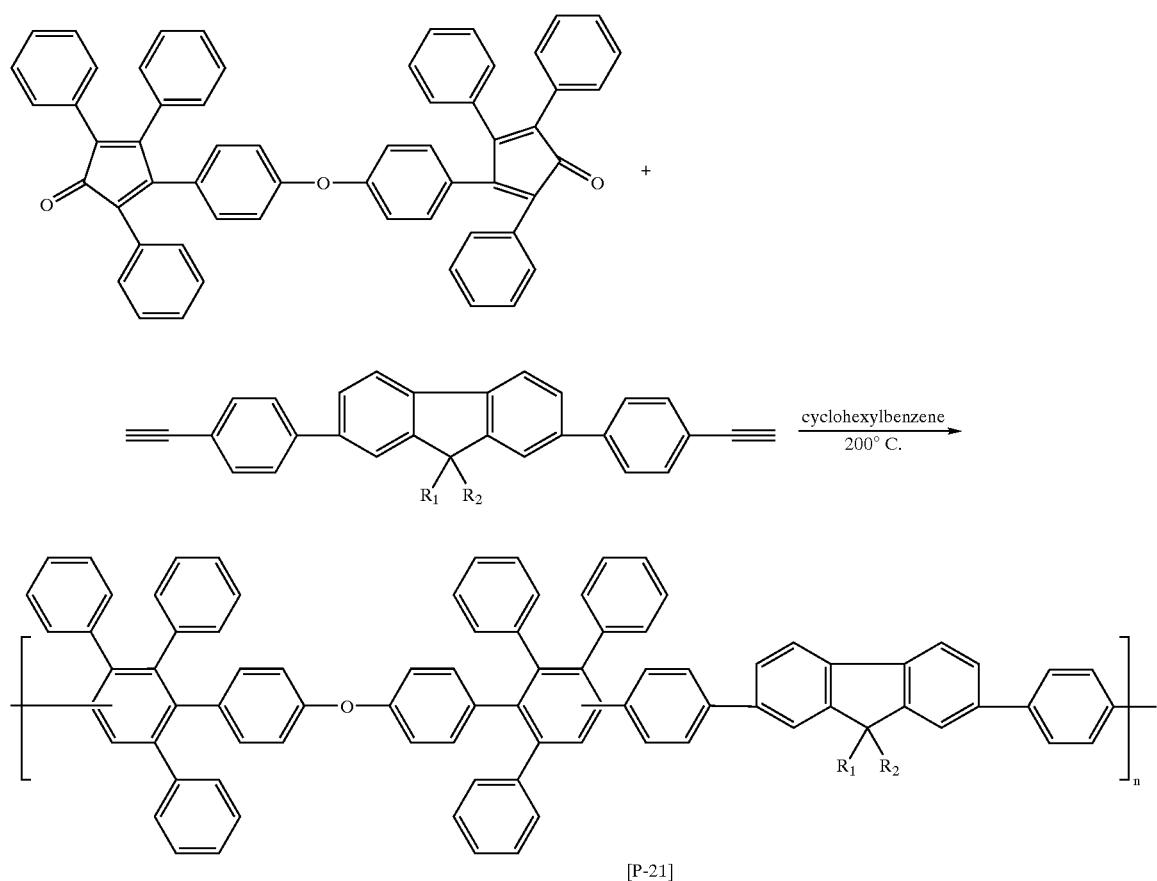
[P-21]
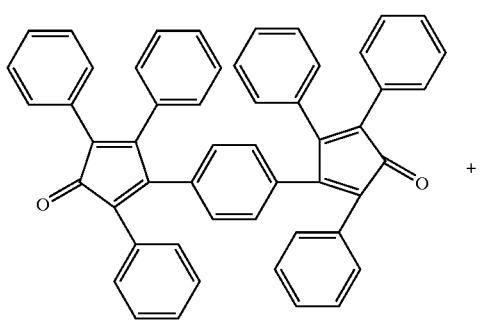

-continued

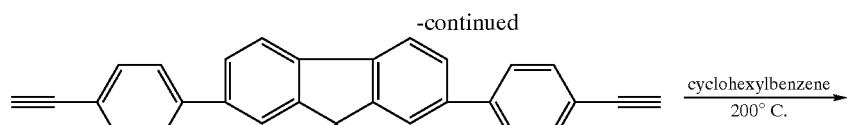

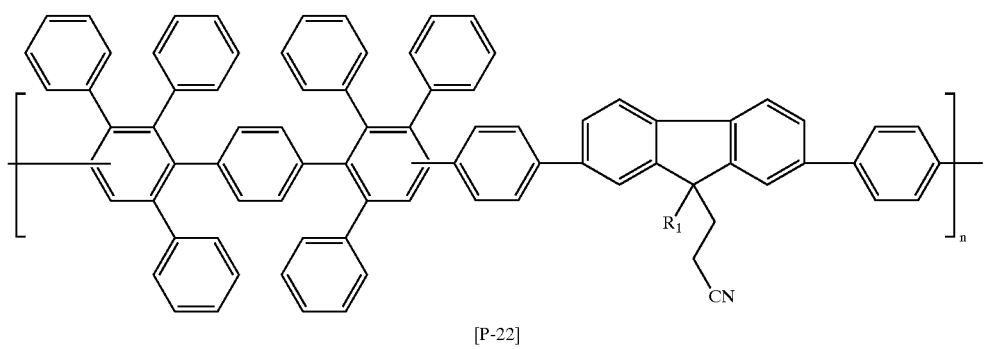

[P-22]

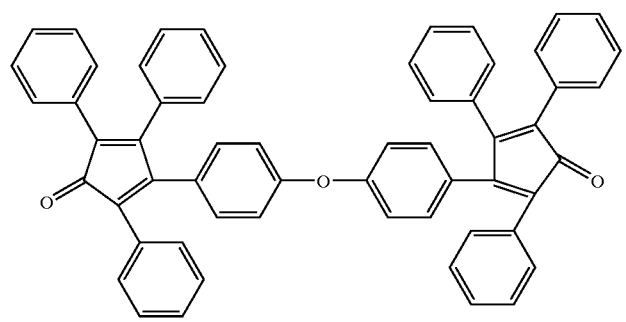

+

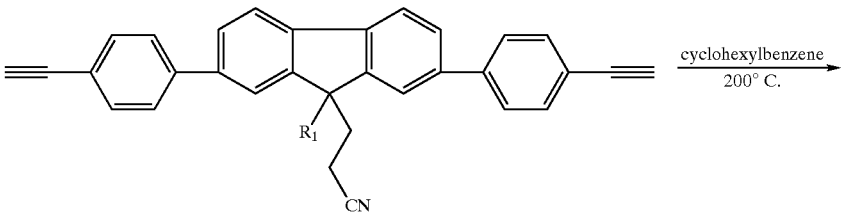

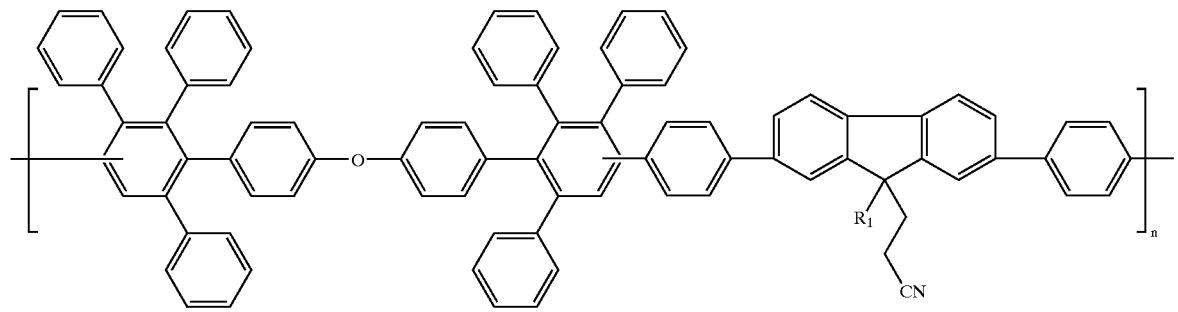

[P-23]

However, with respect to preparation method of the fluorene compounds and/or polymers thereof, besides the above-described method, if a final product has the same structure, any of known methods can be applied. That is, in preparation of the fluorene compounds and/or polymers thereof of the present invention, a solvent, a reaction temperature, a reaction concentration or catalyst, or the like, may not be specifically limited, and likewise the preparation yield.

The organic and polymer group EL element and/or other optical devices of the present invention are fabricated with the fluorene compound and polymers thereof having diverse structures as shown in the Reaction Schemes 1 through 12, especially having a structure of polyphenylene, as a core material.

The fluorene compounds and/or polymers thereof of the present invention can be directly used as an EL material by which they are made into a thin film by a know method such as vacuum-deposition, a spin-coating, a roll-coating, a bar-coating, an ink jet-coating or the like.

In a construction of the EL element, the present invention include not only a typical method in which a light-emitting layer material is inserted between an anode and a cathode, thereby to construct a typical type of an element of anode/light-emitting layer/cathode, but also a method in which both a hole transport layer and an electron transport layer material are used, thereby to construct a type of anode/hole transport layer/light-emitting layer/electron transport layer/cathode. There is no limitation on a construction method of an EL element in the present invention.

As an electrode material for an anode, a material in which a metal or metallic oxide such as ITO (indium-tin oxide), gold, copper, tin oxide and zinc oxide, or an organic semiconductor compound such as polypyrrole, polyaniline and polythiopene is coated onto a transparent support substrate such as glass, transparent plastic or quartz, usually at a thickness of 10 nm to 1 μm can be used. As an electrode material for a cathode, a metal such as sodium, magnesium, calcium, aluminum, indium, silver, gold or copper, or alloys thereof can be used.

Examples of a hole transport layer may include polyvinylcarbazole, 2,5-bis(4'-diethylaminophenyl)-1,3,4-oxadiazole or N,N'-diphenyl-N,N'-(3-methylphenyl)-1,1'-biphenyl-4,4'-diamine (TPD). Examples of an electron transport layer may include a known compound such as tris(8-hydroxycnolynato)aluminum, 2-(4'-t-butylphenyl)-5-(4"-biphenyl)-1,3,4-oxadiazole or 2,4,7-trinitro-9-florenone. These compounds are coated with a known thin film forming method such as a vacuum-depositing, a spin-coating, a casting or an LB method.

The light-emitting material of the present invention can be used by being blended with a hole transport layer, an electron transport layer, a different kind of polymer according to the present invention or a conventional light-emitting polymer such as a soluble PPV or PTh derivative. That is, polyvinylcarbazole, poly(1,4-hexyloxy-2,5-phenylenevinylene), poly(3-hexylthiopene) or the like and a polymer according to the present invention can be dissolved together in an organic solvent such as chloroform, and then they can be coated by a spin-coating or a casting method as a thin film. Limitation on the concentration is not necessary therefor, but the light-emitting polymer of the present invention can be used in the range of 0.001 to 99 wt. %, and preferably, 0.1 to 50 wt. % to polyvinylcarbazole. The thin film can have a thickness of 5 nm to 5 μm, and preferably, 50 nm to 1 μm.

The light-emitting material according to the present invention can be used by being blended with a polymer that can be dissolved in a general organic solvent and then formed into a thin film in the above-described range of concentration and thickness. Examples of polymers usable for these purpose may include a thermoplastic polymer such as polymethylmetaacrylate, polyacrylate, polystyrene, polycarbonate, polyvinylchloride, polyethylene, polypropylene, polyacrylonitrile, polyvinylpyrrolidone, polyvinylalcohol, polyvinylacetate, polyvinylbutylal, polyvinylamine, polycaprolactone, polyethyleneterephtalate, polybutylene-terephtalate, polyurethane, ABS, polysulfone and polyvinylfluoride, and a commonly used resin such as acetal, polyamide, polyimide, polyester, alkid, urea, furan, nylon, melamine, phenol, silicone and epoxy.

EXAMPLES

The present invention will be now described in more detail with reference to the following examples. However, the examples are to illustrate the present invention, and not to limit the scope of the present invention thereto.

Syntheses of Monomers

Example 1

Synthesis of 2,7-bis(phenylacetyl)-9,9'-di-n-hexylfluorene (M-1)

30.0 g (89.6 mol) of 9,9'-di-n-hexylfluorene, 35.8 g (0.26 mol) of aluminum chloride and 500 ml of carbon disulfide were put into a 1 litter 3-neck flask equipped with a stirrer, a thermometer and a reflux condenser under an argon atmosphere, and an ice-bath was installed thereon. 41.5 g (0.26 mol) of phenylacetyl chloride was diluted in a 100 ml of carbon disulfide and then added dropwise to the above reaction mixture in which aluminum chloride was suspended. After the phenylacetyle chloride was entirely added, the ice-bath was removed, and then the reaction mixture was refluxed for 6 hours. The temperature of the reaction mixture was cooled down to room temperature, an ice-bath was installed again. While 20% aqueous hydrochloric acid was gradually added, aluminum chloride complex was disintegrated. The resulting solution was extracted with dichloromethane, and then the combined extract was washed with water and 10% sodium bicarbonate for several times, and dried with anhydrous magnesium sulfate. The drying agent was removed by filtering, and the solvent was then removed to obtain a viscous yellow solution, which was purified through a silica gel column chromatography with a mixture of dichloromethane/hexane (1/1) as an eluent. The obtained solid was recrystallized in a mixture of ethyl acetate/hexane, to obtain a yellow crystal. This solid was dried sufficiently in a vacuum oven at 40° C., to give 16.0 g (31% yield) of the desired product, and its melting point was 92–94° C. Ultraviolet (hereinafter, referred to as 'UV') absorption maximum wavelength of the product in a chloroform solution was 354 nm and maximum PL wavelength was 417 nm.

$^1$H-NMR (CDCl$_3$): δ 0.5 (br, 4H, CH$_2$), 0.71–0.78 (t, 6H, CH$_3$), 0.9–1.1 (m, br, 12H, CH$_2$), 1.95–2.05 (t, br, 4H, CCH$_2$), 7.25–8.05 (m, 16H, aromatic)

Example 2

Synthesis of 2,7-bis (phenylglyoxaloyl)-9,9'-di-n-hexylfluorene (M-2):
Method 1

5.5 g (9.6 mol) of 2,7-bis(phenylacetyl)-9,9'-di-n-hexylfluorene was put into a 250 ml 3-neck flask equipped with a stirrer, a thermometer and a reflux condenser under an argon atmosphere, and 60 ml of DMSO was added in order to dissolve the above compound. 7.6 ml of 48% HBr was added dropwise to the obtained solution with a syringe. The resulting mixture was heated to a temperature of 100° C. and reacted for 4 hours. After then, the temperature was dropped down to room temperature, water and toluene were added to the solution, and then an organic layer was separated and washed with water several times. The organic layer was then dried with anhydrous magnesium sulfate, and then the solvent was removed, to give a yellow liquid. The yellow liquid was purified by the silica gel column chromatography with a mixture of hexane/ethyl acetate (2/1) as an eluent. The obtained solid was recrystallized in a mixture of dichloromethane/ethanol, to give a yellow crystal. The solid was dried sufficiently in a vacuum oven at 40° C., to give 5.1 g (88% yield) of the desired product having a melting point of 91–93° C. UV absorption maximum wavelength of the product in a chloroform solution was 356 nm, and photoluminescence was not observed.

$^1$H-NMR (CDCl$_3$): δ 0.5 (br, 4H, CH$_2$), 0.71–0.78 (t, 6H, CH$_3$), 0.9–1.1 (m, br, 12H, CH$_2$), 1.95–2.05 (t, br, 4H, CCH$_2$), 7.50–8.05 (m, 16H, aromatic)

Example 3

Synthesis of 2,7-bis(phenylglyoxaloyl)-9,9'-di-n-hexylfluorene (M–2):
Method 2

5 g (9.3 mol) of 2,7-bis(phenylethynyl)-9,9'-di-n-hexylfluorene was put into a 250 ml 2-neck flask equipped with a stirrer under an argon atmosphere, and 150 ml of DMSO was added to dissolve the above compound. 7.0 g of NBS (39.2 mmol) was gradually added to the mixture. The reaction mixture was then reacted at room temperature for 24 hours and then extracted with chloroform. The combined extract was washed with water several times and dried with anhydrous magnesium sulfate. When the solvent was removed, a yellow liquid was obtained. The yellow liquid was purified by the silica gel column chromatography with a mixture of hexane/ethyl acetate (2/1) as an eluent. The obtained solid was recrystallized in a mixture of dichloromethane/ethanol, to give a yellow crystal. The solid was dried sufficiently in a vacuum oven at 40° C., to give 3.0 g (53.6% yield) of the desired product. Its melting point, UV absorption maximum wavelength, maximum PL wavelength and the $^1$H-NMR were the same as in Example 2.

Example 4

Synthesis of 2,7-bis(phenylglyoxaloyl)-9,9'-di-n-hexylfluorene (M–2):
Method 3

4.0 g (7.4 mol) of 2,7-bis(phenylethynyl)-9,9'-di-n-hexylfluorene was put into a 1 litter 1-neck flask equipped with a stirrer, into which 700 ml of acetone was added to dissolve it. 120 ml of water in which 3.4 g of magnesium sulfate and 0.34 g of sodium bicarbonate were dissolved was then added to the mixture. 7.1 g of potassium permanganate was added to the mixture by dividing into two portions, and then the resulting mixture was stirred at room temperature for 48 hours. After the reaction was completed, a small amount of sodium nitrite and sulfuric acid were added to the mixture in order to dissolve non-reacted potassium permanganate and MnO$_2$, thereby to obtain a yellow solution. The solution was extracted with toluene. The extract was washed with water several times and dried with anhydrous magnesium sulfate. When the solvent was removed, a yellow liquid was obtained. The yellow liquid was purified by the silica gel column chromatography with a mixture of hexane/ethyl acetate (2/1) as an eluent. The obtained solid was recrystallized in a mixture of dichloromethane/ethanol, to give a yellow crystal. The solid was dried sufficiently in a vacuum oven at 40° C. to give 3.0 g (53.6% yield) of the desired product. Its melting point, UV absorption maximum wavelength, maximum PL wavelength and the $^1$H-NMR were the same as in Example 2.

Example 5

Synthesis of 2,7-bis(phenylglyoxaloyl)-9,9'-di-n-hexylfluorene (M–2):
Method 4

5.0 g (9.3 mol) of 2,7-bis(phenylethynyl)-9,9'-di-n-hexylfluorene was put into a 250 ml 3-neck flask equipped with a stirrer, a thermometer and a reflux condenser under an argon atmosphere, and 200 ml of DMSO was added to dissolve the above compound. 0.42 g of palladium (II) chloride was added to the resulting mixture. After the obtained reaction mixture was reacted at 140° C. for 24 hours, the temperature was dropped down to room temperature, and the mixture was extracted with toluene. The extract was washed with water several times and dried with anhydrous magnesium sulfate. When the solvent was removed, a yellow liquid was obtained. The yellow liquid was purified by the silica gel column chromatography with a mixture of hexane/ethyl acetate (2/1) as an eluent. The obtained solid was recrystallized in a mixture of dichloromethane/ethanol to obtain a yellow crystal. The solid was then dried sufficiently in a vacuum oven at 40° C., to give 4.0 g (71.5% yield) of the desired product. Its melting point, UV absorption maximum wavelength, maximum PL wavelength and the $^1$H-NMR were the same as in Example 2.

Example 6

Synthesis of 2,7-bis(2,4,5-triphenylcyclopentadienon-3-yl)-9,9'-di-n-hexylfluorene (M-3)

4.6 g (7.6 mol) of 2,7-bis(phenylglyoxaloyl)-9,9'-di-n-hexylfluorene and 3.4 g (16.1 mol) of 1,3-diphenylacetone were put into a 150 ml of anhydrous ethanol in a 3-neck flask equipped with a stirrer, a thermometer and a reflux condenser under an argon atmosphere. The resulting mixture heated to a melting point of ethanol, so as to dissolve the reactants. 0.31 g of potassium hydroxide was dissolved in 6.2 ml of water, which was slowly added to the above mixture and then the resulting mixture was refluxed for 3 hours. When the temperature was dropped down to room temperature, a solid was precipitated. The solid was filtered, washed with cold ethanol and then recrystallized in a mixture of dichloromethane and ethanol, to obtain a black solid. The solid was dried sufficiently in a vacuum oven at 40° C., to give 4.5 g (62% yield) of the desired product having a melting point of 235–237° C. UV absorption maximum wavelengths of the product in a chloroform solution were 308 nm and 401 nm. No photoluminescence phenomenon was observed.

$^1$H-NMR (CDCl$_3$): δ 0.25 (br, 4H, CH$_2$), 0.82–0.90 (m, 10H, CH$_3$CH$_3$), 0.95–1.05 (m, 4H, CH$_2$), 1.15–1.20 (m, 4H, CH$_2$), 1.42–1.50 (t, br, 4H, CCH$_2$), 6.81–7.45 (m, 36H, aromatic)

Example 7

Synthesis of 2,7-bis[(phenylacetyl)phenyl]-9,9'-di-n-hexylfluorene (M-4)

30.0 g (61.6 mmol) of 9,9'-di-n-hexylfluorene, 19.0 g (0.14 mol) of aluminum chloride and 500 ml of carbon disulfide were put into a 1 litter 3-neck flask equipped with a stirrer, a thermometer and a reflux condenser under an argon atmosphere, and an ice-bath was installed therein. A solution in which 22.0 g (0.14 mol) of phenylacetyl chloride was diluted in 100 ml of carbon disulfide was gradually added dropwise to the above mixture in which aluminum chloride was suspended. After the phenylacetyl chloride was entirely added, the ice-bath was removed therefrom, and then the resulting mixture was refluxed for 6 hours. The temperature of the reaction mixture was dropped down to room temperature, an ice-bath was installed again. 20% of hydrochloric acid solution was then gradually dropped to decompose the complex of aluminum chloride. This solution was extracted with dichloromethane. The extract was washed with water and 10% sodium bicarbonate for several times and then dried with anhydrous magnesium sulfate. When the solvent was removed, a viscous yellow solution was obtained. This solution was crystallized in a mixture of dichloromethane/ethanol, to obtain a yellow crystal. The obtained solid was dried sufficiently in a vacuum oven at 40° C., to give 36.0 g (81% yield) of the desired product having a melting point of 129–131° C. UV maximum absorption wavelength of the product in a chloroform solution was 354 nm. Maximum PL wavelength was 417 nm.

$^1$H-NMR (CDCl$_3$): δ 0.65–0.75(m, 10H, CH$_2$CH$_3$), 1.05–1.15(m, 12H, CH$_2$), 2.01–2.07(t, br, 4H, CCH$_2$), 4.35 (s, 4H, CH$_2$), 7.22–8.15 (m, 24H, aromatic)

Example 8

Synthesis of 2,7-bis(benzil)-9,9'-di-n-hexylfluorene (M-5)

12.0 g (12.4 mmol) of 2,7-bis(benzyl)-9,9'-di-n-hexylfluorene was put into a 500 ml 3-neck flask equipped with a stirrer, a thermometer and a reflux condenser under an argon atmosphere, and 250 ml of DMSO was added to dissolve the above compound. 13.5 ml of 48% HBr was added dropwise to the resulting solution with a syringe. The reaction mixture was heated to a temperature of 100° C. and reacted for 4 hours. The temperature was then dropped down to room temperature, water and toluene were added to the mixture. The organic layer was separated, washed with water several times and then dried with anhydrous magnesium sulfate. When the solvent was removed, a yellow liquid was obtained. The obtained yellow liquid was crystallized in a mixture of hexan/ethyl acetate, to obtain a yellow crystal. The solid was dried sufficiently in a vacuum oven at 40° C. to give 10.0 g (80% yield) of the desired product having a melting point of 138–139° C. UV absorption maximum wavelength of the product in a chloroform solution was 370 nm. No photoluminescence phenomenon was observed.

$^1$H-NMR (CDCl$_3$): δ 0.65–0.75 (m, 10H, CH$_2$CH$_3$), 1.05–1.15 (m, 12H, CH$_2$), 2.01–2.07 (t, br, 4H, CCH$_2$), 7.50–8.10 (m, 24H, aromatic)

Example 9

Synthesis of 2,7-bis(2,4,5-triphenylcyclopentadienone-3-phenyl)-9,9'-di-n-hexylfluorene (M-6)

12.0 g (16.0 mmol) of 2,7-bis(benzil)-9,9'-di-n-hexylfluorene and 7.4 g (35.2 mmol) of 1,3-diphenylacetone and 200 ml of anhydrous butanol were put into a 250 ml 3-neck flask equipped with a stirrer, a thermometer and a reflux condenser under an argon atmosphere. The resulting mixture was heated to a melting point of butanol in order to dissolve the reactants. 2 g of benzyltrimethylammonium hydroxide (40% solution in methanol) was gradually added to the reaction mixture and then the resulting mixture was refluxed for 5 hours. When the temperature was dropped down to room temperature, to precipitate a solid. The solid was filtered, washed with cold ethanol, dissolved again in butanol by heating and then recrystallized, to obtain a dark brown solid. The solid was dried sufficiently in a vacuum oven at 4°° C., to give 10.0 g (57% yield) of the desired product.

$^1$H-NMR (CDCl$_3$): δ 0.65–0.75 (m, 10H, CH$_2$CH$_3$), 1.05–1.15 (br, 12H, CH$_2$), 2.01–2.07(br, 4H, CCH$_2$), 7.00–7.75 (m, 44H, aromatic)

Example 10

Reaction of 2,7-bis(2,4,5-triphenylcyclopentadienon-3-yl)-9,9'-di-n-hexylfluorene and phenylacetylene (M-7)

0.4 g (0.42 mmol) of 2,7-bis(2,4,5-triphenylcyclopentadienon-3-yl)-9,9'-di-n-hexylfluorene and 0.13 g (1.26 mmol) of phenylacetylene were put into a 50 ml ampoule flask equipped with a stirrer and a thermometer, to which 5 ml of xylene was added. After the mixture was degassed by a freeze-pump-thaw method that freezing and thawing were repeatedly performed with a pump, argon gas was injected into the reactor, and then the reactor was sealed. The reaction mixture in the ampoule was refluxed for 4 days. After the reaction was completed, the temperature was dropped down to room temperature. The ampoule was opened, and then the reaction mixture was poured into methanol, to give a precipitate. The obtained solid was filtered, washed with methanol several times and then dried sufficiently in a vacuum oven at 40° C., to give 0.31 g (67% yield) of the desired product having a melting point of 134–136° C. UV absorption maximum wavelength of the product in a chloroform solution was 325 nm. Maximum PL wavelength was 379 nm.

Example 11

Reaction of tetracyclopentadienone and 2,7-diethynyl-9,9'-di-n-hexylfluorene (M-7)

0.5 g (1.3 mmol) of tetracyclopentadienone and 1.27 g (3.3 mmol) of 2,7-diethynyl-9,9'-di-n-hexylfluorene were put into a 20 ml of ampoule flask equipped with a stirrer, and then 5 ml of cyclohexylbenzene was added to the mixture. After the mixture was degassed by a freeze-pump-thaw method that freezing and thawing were repeatedly performed with a pump, argon gas was injected into the ampoule and then the ampoule was sealed. The reaction mixture was reacted at 200° C. for 24 hours. After the reaction was completed, the sealed ampoule was opened, and then the reaction mixture was gradually dropped to a mixture of acetone/methanol (800 ml/200 ml) to precipitate a solid. The precipitated solid was filtered and dissolved in chloroform, and then re-precipitated in methanol, to give a purified solid. The precipitated solid was filtered, washed with methanol thoroughly, and then dried sufficiently in a vacuum oven at 40° C. A weight of the obtained white solid was 1.06 g (75% yield) and its melting point was 157–160° C. UV absorption maximum wavelength of the product in a chloroform solution was 327 nm. Maximum PL wavelength was 377 nm.

$^1$H-NMR (CDCl$_3$): δ 0.11–0.38 (br, s, CH$_3$), 0.76–1.22 (br, m, CH$_2$), 1.38–1.60 (br, s, CCH$_2$), 6.65–7.61 (m, aromatic)

Syntheses of Polymers

Example 12

Polymerization of 2,7-bis(2,4,5-triphenylcyclopentadienon-3-yl)-9,9'-di-n-hexylfluorene and 2,7-diethynyl-9,9'-di-n-hexylfluorene (P-1)

0.5 g (0.52 mmol) of 2,7-bis(2,4,5-triphenylcyclopentadienon-3-yl)-9,9'-di-n-hexylfluorene and 0.2 g (0.52 mmol) of 2,7-diethynyl-9,9'-di-n-hexylfluorene were put into a 50 ml ampoule flask equipped with a stirrer and a thermometer, and 2.6 ml (0.4 mol/L) of cyclohexylbenzene was added thereto. After the mixture was degassed by a freeze-pump-thaw method that freezing and thawing were repeatedly performed with a pump, argon gas was injected into the ampoule, and then the ampoule was sealed. The reaction mixture was reacted at 200° C. for 40 hours. When the reaction was completed, the temperature was dropped down to room temperature. The ampoule was opened and 0.01 g of phenylacetylene was added to the reaction mixture. The resulting mixture was reacted additionally at 200° C. for 5 hours for end-capping. The temperature was dropped down to room temperature, and the ampoule was opened, to which toluene was added to dilute the reaction mixture. A mixture of acetone/methanol (300 ml/700 ml) was added in order to precipitate the desired product. The precipitated solid was filtered and dissolved again in chloroform, thereby to re-precipitate. The solid was filtered and dried sufficiently in a vacuum oven at 40° C. The obtained product was 0.6 g. UV absorption maximum wavelength of the product in a thin film was 334 nm and maximum PL wavelength was 443 nm.

Example 13

Polymerization of 2,7-bis(2,4,5-triphenylcyclopentadienon-3-yl)-9,9'-di-n-hexylfluorene and 2,7-bis(trimethylsilylethynyl)-9,9'-di-n-hexylfluorene (P-2)

0.4 g (0.42 mmol) of 2,7-bis(2,4,5-triphenylcyclopentadienon-3-yl)-9,9'-di-n-hexylfluorene and 0.22 g (0.42 mmol) of 2,7-bis(trimethylsilylethynyl)-9,9'-di-n-hexylfluorene were put into a 50 ml ampoule flask equipped with a stirrer and a thermometer, and then 1 ml (0.8 mol/L) of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 220° C. for 4 days. When the reaction was completed, the temperature was dropped down to room temperature and the ampoule was opened. 0.02 g of phenylacetylene was added into the ampoule and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform, and then re-precipitated. The solid was filtered and dried sufficiently in a vacuum oven at 40° C. The obtained product was 0.54 g. UV absorption maximum wavelength of the product in a thin film was 330 nm and maximum PL wavelength was 433 nm.

Example 14

Polymerization of 2,7-bis(2,4,5-triphenylcyclopentadienon-3-yl)-9,9'-di-n-hexylfluorene and 2,7-bis(phenylethynyl)-9,9'-di-n-hexylfluorene (P-3)

0.5 g (0.52 mmol) of 2,7-bis(2,4,5-triphenylcyclopentadienon-3-yl)-9,9'-di-n-hexylfluorene and 0.28 g (0.52 mmol) of 2,7-bis(phenylethynyl)-9,9'-di-n-hexylfluorene were put into a 50 ml ampoule flask equipped with a stirrer and a thermometer, and then 2.6 ml (0.4 mol/L) of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 40 hours. When the reaction was completed, the temperature was dropped down to room temperature and the ampoule was opened. 0.01 g of phenylacetylene was added into the ampoule, and then the mixture was reacted additionally for 5 hours at 200° C. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.7 g. UV absorption maximum wavelength of the product in a thin film was 330 nm and maximum PL wavelength was 450 nm.

Example 15

Polymerization of 2,7-bis(2,4,5-triphenylcyclopentadienon-3-yl)-9,9'-di-n-hexylfluorene and 2,7-bis(phenylethynyl)-9,9'-di-n-hexylfluorene (P-3)

0.4 g (0.42 mmol) of 2,7-bis(2,4,5-triphenylcyclopentadienon-3-yl)-9,9'-di-n-hexylfluorene and 0.225 g (0.42 mmol) of 2,7-bis(phenylethynyl)-9,9'-di-n-hexylfluorene (P-2) were put into a 50 ml 2-neck flask equipped with a stirrer, a thermometer and a reflux condenser, and then 3 ml of phenyl ether was added thereto. After the mixture was degassed by a freeze-pump-thaw method that freezing and thawing were repeatedly performed with a pump, argon gas was injected thereto, and then the mixture was refluxed for two days. When the reaction was completed, the temperature was dropped down to room temperature and toluene was added to the mixture to dilute it. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.37 g. UV absorption maximum wavelength of the material in a state of thin film and maximum PL wavelength were the same as in Example 13.

Example 16

Polymerization of 2,7-bis(2,4,5-triphenylcyclopentadienon-3-yl)-9,9'-di-n-hexylfluorene and 1,4-bis(phenylethynyl)benzene (P-4)

0.5 g (0.52 mmol) of 2,7-bis(2,4,5-triphenylcyclopentadienon-3-yl)-9,9'-di-n-hexylfluorene and 0.147 g (0.52 mmol) of 1,4-bis(phenylethynyl)benzene were put into a 50 ml ampoule flask equipped with a stirrer and a thermometer, and then 2.6 ml (0.4 mol/L) of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 40 hours. When the reaction was completed, the temperature was dropped down to room temperature and the ampoule was opened. 0.01 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.5 g.

UV absorption maximum wavelength of the product in a thin film was 322 nm and maximum PL wavelength was 453 nm.

Example 17

Polymerization of 2,7-bis(2,4,5-triphenylcyclopentadienon-3-yl)-9,9'-di-n-hexylfluorene and 1,4-diethynylbenzene (P-5)

0.5 g (0.52 mmol) of 2,7-bis(2,4,5-triphenylcyclopentadienon-3-yl)-9,9'-di-n-hexylfluorene and 66.5 mg (0.52 mmol) of 1,4-diethynylbenzene were put into a 50 ml ampoule flask equipped with a stirrer and a thermometer, and then 2.6 ml (0.4 mol/L) of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 40 hours. When the reaction was completed, the temperature was dropped down to room temperature and the ampoule was opened. 0.01 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.5 g. UV absorption maximum wavelength of the product in a thin film was 324 nm and maximum PL wavelength was 434 nm.

Example 18

Polymerization of 2,7-bis(2,4,5-triphenylcyclopentadienon-3-yl)-9,9'-di-n-hexylfluorene and 3,6-diethynyl-N-(n-hexyl)carbazole (P-6)

0.4 g (0.42 mmol) of 2,7-bis(2,4,5-triphenylcyclopentadienon-3-yl)-9,9'-di-n-hexylfluorene and 0.126 g (0.42 mmol) of 3,6-diethynyl-N-(n-hexyl)carbazole were put into a 50 ml ampoule flask equipped with a stirrer and a thermometer, and then 2.1 ml (0.4 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.44 g. UV absorption maximum wavelength of the product in a thin film was 308 nm and maximum PL wavelength was 487 nm.

Example 19

Polymerization of 2,7-bis(2,4,5-triphenylcyclopentadienon-3-yl)-9,9'-di-n-hexylfluorene and 3,6-bis(trimethylethynyl)-N-(n-hexyl)carbazole (P-7)

0.4 g (0.42 mmol) of 2,7-bis(2,4,5-triphenylcyclopentadienon-3-yl)-9,9'-di-n-hexylfluorene and 0.187 g (0.42 mmol) of 3,6-bis(trimethylsilylethynyl)-N-(n-hexyl)carbazole were put into a 50 ml ampoule flask equipped with a stirrer and a thermometer, and then 1 ml (0.8 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.5 g. UV absorption maximum wavelength of the product in a thin film was 303 nm and maximum PL wavelength was 472 nm.

Example 20

Polymerization of 2,7-bis(2,4,5-triphenylcyclopentadienon-3-yl)-9,9'-di-n-hexylfluorene and 2,6-diethynyl pyridine (P-8)

0.4 g (0.42 mmol) of 2,7-bis(2,4,5-triphenylcyclopentadienon-3-yl)-9,9'-di-n-hexylfluorene and 0.05 g (0.42 mmol) of 2,6-diethynyl pyridine were put into a 50 ml ampoule flask equipped with a stirrer and a thermometer, and then 2.1 ml (0.4 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.41 g. UV absorption maximum wavelength of the product in a thin film was 324 nm and maximum PL wavelength was 484 nm.

Example 21

Polymerization of 2,7-bis(2,4,5-triphenylcyclopentadienon-3-yl)-9,9'-di-n-hexylfluorene and 2,6-bis(trimethylsilylethynyl)pyridine (P-9)

0.4 g (0.42 mmol) of 2,7-bis(2,4,5-triphenylcyclopentadienon-3-yl)-9,9'-di-n-hexylfluorene and 0.114 g (0.42 mmol) of 2,6-bis(trimethylsilylethynyl) pyridine were put into a 50 ml ampoule flask equipped with a stirrer and a thermometer, and then 1 ml (0.8 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.32 g. UV absorption maximum wavelength of the product in a thin film was 322 nm and maximum PL wavelength was 414 nm.

Example 22

Polymerization of 2,7-bis(2,4,5-triphenylcyclopentadienon-3-yl)-9,9'-di-n-hexylfluorene and 9,10-bis(phenylethynyl)anthracene (P-10)

0.4 g (0.42 mmol) of 2,7-bis(2,4,5-triphenylcyclopentadienon-3-yl)-9,9'-di-n-hexylfluorene and 0.16 g (0.42 mmol) of 9,10-bis(phenylethynyl) anthracene were put into a 50 ml ampoule flask equipped with a stirrer and a thermometer, and then 1 ml (0.8 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.48 g. UV absorption maximum wavelength of the product in a thin film was 324 nm and a maximum PL wavelength was 442 nm.

Example 23

Polymerization of 2,7-bis(2,4,5-triphenylcyclopentadienon-3-yl)-9,9'-di-n-hexylfluorene and 2,7-bis(4-ethynylphenyl)-9,9'-di-n-hexylfluorene (P-11)

0.4 g (0.42 mmol) of 2,7-bis(2,4,5-triphenylcyclopentadienon-3-yl)-9,9'-di-n-hexylfluorene and 0.225 g (0.42 mmol) of 2,7-bis(4-ethynylphenyl)-9,9'-di-n-hexylfluorene were put into a 50 ml ampoule flask equipped with a stirrer and a thermometer, and then 4.2 ml (0.42 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.58 g. UV absorption maximum wavelength of the product in a thin film was 337 nm and maximum PL wavelength was 416 nm.

Example 24

Polymerization of 2,7-bis(2,4,5-triphenylcyclopentadienon-3-yl)-9,9'-di-n-hexylfluorene and 2,7-bis(4-ethynylphenyl)-9-n-hexyl-9'-(2-cyanoethyl) fluorene (P-12)

0.4 g (0.42 mmol) of 2,7-bis(2,4,5-triphenylcyclopentadienon-3-yl)-9,9-di-n-hexylfluorene and 0.21 g (0.42 mmol) of 2,7-bis(4-ethynylphenyl)-9-n-hexyl-9'-(2-cyanoethyl) fluorene were put into a 50 ml ampoule flask equipped with a stirrer and a thermometer, and then 2.1 ml (0.4 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.49 g. UV absorption maximum wavelength of the product in a thin film was 335 nm and maximum PL wavelength was 496 and 541 nm.

Example 25

Polymerization of 2,7-bis(2,4,5-triphenylcyclopentadienone-3-phenyl)-9,9'-di-n-hexylfluorene and 3,6-diethynyl-N-(n-hexyl)carbazole (P-13)

0.5 g (0.45 mmol) of 2,7-bis(2,4,5-triphenylcyclopentadienone-3-phenyl)-9,9'-di-n-hexylfluorene and 0.13 g (0.45 mmol) of 3,6-diethynyl-N-(n-hexyl)carbazole were put into a 50 ml ampoule flask equipped with a stirrer and a thermometer, and then 2.1 ml (0.4 mol/L) of phenyl ether was added thereto. After the mixture was degassed by a freeze-pump-thaw method that freezing and thawing were repeatedly performed with a pump, argon gas was injected thereto and then the ampoule was sealed. The mixture was reacted at 220° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for end-capping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.44 g. UV absorption maximum wavelength of the product in a thin film was 304 nm and maximum PL wavelength was 473 nm.

Example 26

Co-polymerization of 2,7-bis(2,4,5-triphenylcyclopentadienon-3-yl)-9,9'-di-n-hexylfluorene, 3,3-bis(1,4-phenylene)bis(2,4,5-triphenylcyclopentadienone) and 2,7-bis(4-ethynylphenyl)-9,9'-di-n-hexylfluorene (P-14)

0.2 g (0.21 mmol) of 2,7-bis(2,4,5-triphenylcyclopentadienon-3-yl)-9,9'-di-n-hexylfluorene, 0.145 g (0.21 mmol) of 3,3-bis(1,4-phenylene)bis(2,4,5-triphenylcyclopentadienone) and 0.225 g (0.42 mmol) of 2,7-bis(4-ethynylphenyl)-9,9'-di-n-hexylfluorene were put into a 50 ml ampoule flask equipped with a stirrer and a thermometer, and then 4.2 ml (0.2 mol/L) of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for endcapping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.54 g. UV absorption maximum wavelength of the product in a thin film was 339 nm and maximum PL wavelength was 442 nm.

Example 27

Co-polymerization of 2,7-bis(2,4,5-triphenylcyclopentadienon-3-yl)-9,9'-di-n-hexylfluorene, 3,3-(oxy-di-1,4-phenylene)bis(2,4,5-triphenylcyclopentadienone) and 2,7-bis(4-ethynylphenyl)-9,9'-di-n-hexylfluorene (P-15)

0.2 g (0.21 mmol) of 2,7-bis(2,4,5-triphenylcyclopentadienon-3-yl)-9,9'-di-n-hexylfluorene, 0.165 g (0.21 mmol) of 3,3-(oxy-di-1,4-phenylene)bis(2,4,5-triphenylcyclopentadienone) and 0.225 g (0.42 mmol) of 2,7-bis(4-ethynylphenyl)-9,9'-di-n-hexylfluorene were put into a 50 ml ampoule flask equipped with a stirrer and a thermometer, and then 4.2 ml (0.2 mol/L) of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 3 days. When the reaction was completed, the temperature was dropped down to room temperature and the ampoule was opened. 0.02 g of phenylacetylene was added into the ampoule, and then the mixture was reacted additionally for 5 hours at 200° C. for endcapping. The temperature was dropped down to room temperature and the ampoule was opened, to which toluene was added to dilute the reaction mixture. A mixture of acetone/methanol (300 ml/700 ml) was added to the mixture, to precipitate the product. The precipitated product was filtered and dissolved again in chloroform, and then re-precipitation was formed to obtain purified polymer. The solid was filtered and dried sufficiently in a vacuum oven at 40° C. The obtained product was 0.58 g. UV absorption maximum wavelength of the product in a thin film was 339 nm and maximum PL wavelength was 428, 490 and 549 nm.

Example 28

Reaction between poly(9,9'-dihexyl-2,7-biphenyleneethynylene) and tetraphenylcyclopentadienone (P-16)

0.2 g of poly(9,9'-dihexyl-2,7-biphenyleneethynylene) and 0.4 g (1 mmol) of tetraphenylcyclopentadienone were put into a 50 ml 2-neck flask equipped with a stirrer, a thermometer and a reflux condenser, and then 3 ml of phenyl ether was added thereto. After the mixture was degassed by a freeze-pump-thaw method that freezing and thawing were repeatedly performed with a pump, argon gas was injected thereto and then the ampoule was sealed. The mixture was refluxed for 2 days. When the reaction was completed, the temperature was dropped down to room temperature and toluene was added to the mixture to dilute it. A mixture of acetone/methanol (300 ml/700 ml) was added to the mixture, to precipitate the product. The precipitated product was filtered and dissolved again in chloroform and then re-precipitated. The solid was filtered and dried sufficiently in a vacuum oven at 40° C. The obtained product was 0.2 g. UV absorption maximum wavelength of the product in a thin film was 345 nm and maximum PL wavelength was 416, 493 and 569 nm.

Example 29

Cyclodehydrogenation in a P-3 molecule (P-17)

0.2 g of polyacetylene, 3.36 g (10.6 mmol) of copper (II) trifluoromethanesulfonate and 1.43 g (10.6 mmol) of aluminum chloride were put into a 50 ml 2-neck flask equipped with a stirrer, and then 25 ml of carbon disulfide was added thereto. The reaction mixture was reacted at room temperature for 24 hours. After the reaction was completed, a small amount of carbon disulfide was left by removing most of it. When the reaction mixture was slowly dropped into a solution in which a small amount of hydrochloric acid was diluted in 500 ml of methanol, a black solid was precipitated. The solid was filtered, thoroughly washed with methanol and chloroform in order, and then dried in a vacuum oven at 40° C. The obtained product was 0.19 g. This polymer was not dissolved in a general organic solvent.

Example 30

Polymerization of 3,3-(1,4-phenylene)bis(2,4,5-triphenylcyclopentadienone) and 2,7-diethynyl-9,9'-di-n-hexylfluorene (P-18)

0.5 g (0.72 mmol) of 3,3-(1,4-phenylene)bis(2,4,5-triphenylcyclopentadienone) and 0.3 g (0.80 mmol) of 2,7-diethynyl-9,9'-di-n-hexylfluorene were put into a 50 ml ampoule flask equipped with a stirrer and a thermometer, and then 5 ml of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 24 hours. When the reaction was completed, the temperature was dropped down to room temperature, and then the ampoule was opened. The reaction mixture was then slowly dropped to a mixture of acetone/methanol (800 ml/200 ml) in order to precipitate the produced polymer. The precipitated polymer was filtered, dissolved in chloroform and re-precipitated in methanol to obtain a purified polymer. The polymer was washed with methanol and then dried sufficiently in a vacuum oven at 40° C. The obtained yellow-colored polymer was 0.77 g. UV absorption maximum wavelength of the product in a thin film was 328 nm and maximum PL wavelength was 407 nm.

Example 31

Polymerization of 3,3-(oxy-para-phenylene)bis(2,4,5-triphenylcyclopentadienone) and 2,7-diethynyl-9,9'-di-n-hexylfluorene (P-19)

0.5 g (0.64 mmol) of 3,3-(oxy-para-phenylene)bis(2,4,5-triphenyl-cyclopentadienone) and 0.28 g (0.73 mmol) of 2,7-diethynyl-9,9'-di-n-hexylfluorene were put into a 50 ml ampoule flask equipped with a stirrer and a thermometer, and then 5 ml of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 24 hours. When the reaction was completed, the temperature was dropped down to room temperature, and then the ampoule was opened. The reaction mixture was then slowly dropped to a mixture of acetone/methanol (800 ml/200 ml) in order to precipitate the produced polymer. The precipitated polymer was filtered, dissolved in chloroform and then re-precipitated in methanol to obtain a purified polymer. The polymer was thoroughly washed with methanol and then dried sufficiently in a vacuum oven at 40° C. The obtained yellow-colored polymer was 0.74 g. UV absorption maximum wavelength of the product in a thin film was 320 nm and maximum PL wavelength was 460 nm.

Example 32

Polymerization of 3,3-(1,4-phenylene)bis(2,4,5-triphenylcyclopentadienone) and 2,7-bis(4-ethynylphenyl)-9,9'-di-n-hexylfluorene (P-20)

0.47 g (0.68 mmol) of 3,3-(1,4-phenylene)bis(2,4,5-triphenylcyclopentadienone) and 0.4 g (0.74 mmol) of 2,7-bis(4-ethynylphenyl)-9,9'-di-n-hexylfluorene were put into a 50 ml ampoule flask equipped with a stirrer and a thermometer, and then 5 ml of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 24 hours. When the reaction was completed, the temperature was dropped down to room temperature, and then the ampoule was opened. The reaction mixture was then slowly dropped to a mixture of acetone/methanol (800 ml/200 ml) in order to precipitate the produced polymer. The precipitated polymer was filtered, dissolved in chloroform and then re-precipitated in methanol to obtain a purified polymer. The polymer was thoroughly washed with methanol and then dried sufficiently in a vacuum oven at 40° C. The obtained yellow-colored polymer was 0.74 g. UV absorption maximum wavelength of the product in a thin film was 342 nm and maximum PL wavelength was 408 nm.

Example 33

Polymerization of 3,3-(oxy-para-phenylene)bis(2,4,5-triphenylcyclopentadienone) and 2,7-bis(4-ethynylphenyl)-9,9'-di-n-hexylfluorene (P-21)

0.53 g (0.67 mmol) of 3,3-(oxy-para-phenylene)bis(2,4,5-triphenylcyclopentadienone) and 0.4 g (0.73 mmol) of 2,7-bis(4-ethynylphenyl)-9,9'-di-n-hexylfluorene were put into a 50 ml ampoule flask equipped with a stirrer and a thermometer, and then 5 ml of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 24 hours. When the reaction was completed, the temperature was dropped down to room temperature, and then the ampoule was opened. The reaction mixture was then slowly dropped to a mixture of acetone/methanol (800 ml/200 ml) in order to precipitate the produced polymer. The precipitated polymer was filtered, dissolved in chloroform and then re-precipitated in methanol to obtain a purified polymer. The polymer was thoroughly washed with methanol and then dried sufficiently in a vacuum oven at 40° C. The obtained yellow-colored polymer was 0.74 g. UV absorption maximum wavelength of the product in a thin film was 342 nm and maximum PL wavelength was 410 nm.

Example 34

Polymerization of 3,3-(1,4-phenylene)bis(2,4,5-triphenylcyclopentadienone) and 2,7-bis(4-ethynylphenyl)-9-n-hexyl-9'-(2-cyanoethyl) fluorene (P-22)

0.47 g (0.68 mmol) of 3,3-(1,4-phenylene)bis(2,4,5-triphenylcyclopentadienone) and 0.4 g (0.74 mmol) of 2,7-bis(4-ethynylphenyl)-9-n-hexyl-9'-(2-cyanoethyl) fluorene were put into a 50 ml ampoule flask equipped with a stirrer and a thermometer, and then 5 ml of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 24 hours. When the reaction was completed, the temperature was dropped down to room temperature, and then the ampoule was opened. The reaction mixture was then slowly dropped to a mixture of acetone/methanol (800 ml/200 ml) in order to precipitate the produced polymer. The precipitated polymer was filtered, dissolved in chloroform and then re-precipitated in methanol to obtain a purified polymer. The polymer was thoroughly washed with methanol and then dried sufficiently in a vacuum oven at 40° C. The obtained yellow-colored polymer was 0.74 g. UV absorption maximum wavelength of the product in a thin film was 340 nm and maximum PL wavelength was 409 nm.

Example 35

Polymerization of 3,3-(oxy-para-phenylene)-bis(2,4,5-triphenylcyclopentadienone) and 2,7-bis(4-ethynylphenyl)-9-n-hexyl-9'-(2-cyanoethyl) fluorene (P-23)

0.56 g (0.72 mmol) of 3,3-(oxy-para-phenylene)-bis(2,4,5-triphenylcyclopentadienone) and 0.4 g (0.79 mmol) of 2,7-bis(4-ethynylphenyl)-9-n-hexyl-9'-(2-cyanoethyl) fluorene were put into a 50 ml ampoule flask equipped with a stirrer and a thermometer, and then 5 ml of cyclohexylbenzene was added thereto. After the mixture was degassed by a freeze-pump-thaw method that freezing and thawing were repeatedly performed with a pump, argon gas was injected thereto and then the ampoule was sealed. The mixture was reacted at 200° C. for 24 hours. When the reaction was completed, the temperature was dropped down to room temperature, and then the ampoule was opened. The reaction mixture was then slowly dropped to a mixture of acetone/methanol (800 ml/200 ml) in order to precipitate the produced polymer. The precipitated polymer was filtered, dissolved in chloroform and then re-precipitated in methanol to obtain a purified polymer. The polymer was thoroughly washed with methanol and then dried sufficiently in a vacuum oven at 40° C. The obtained yellow-colored polymer was 0.74 g. UV absorption maximum wavelength of the product in a thin film was 338 nm and maximum PL wavelength was 390 nm.

Example 36

Structure analyses, Ultraviolet-Visible absorption, PL and EL properties

Figure 2:
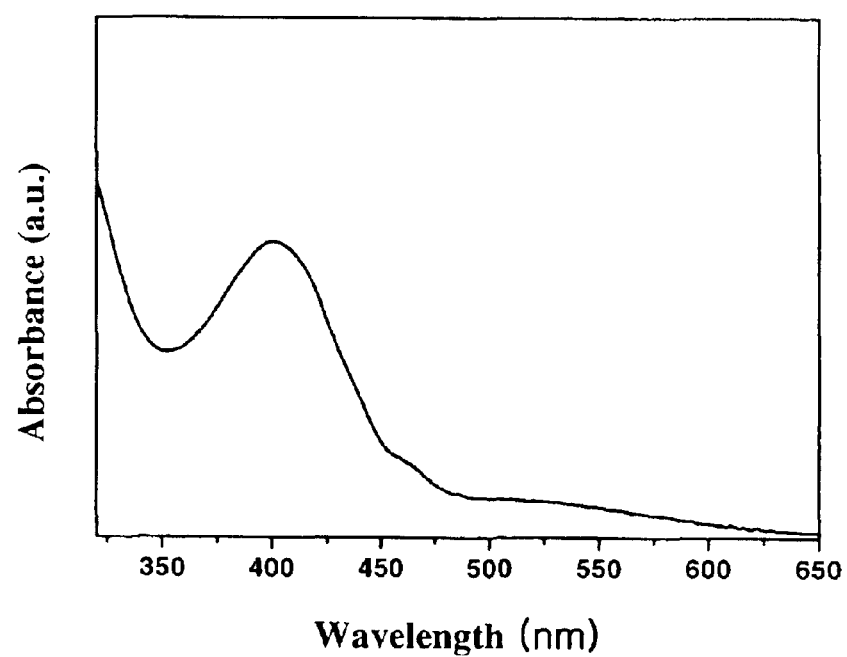
Figure 3:
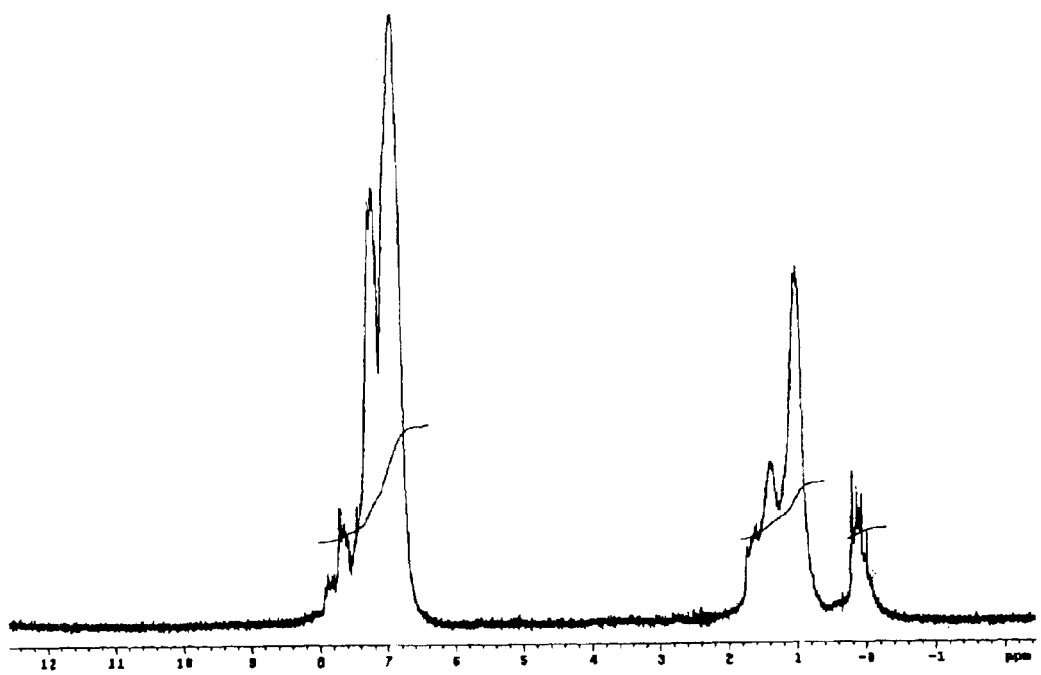
Figure 4:
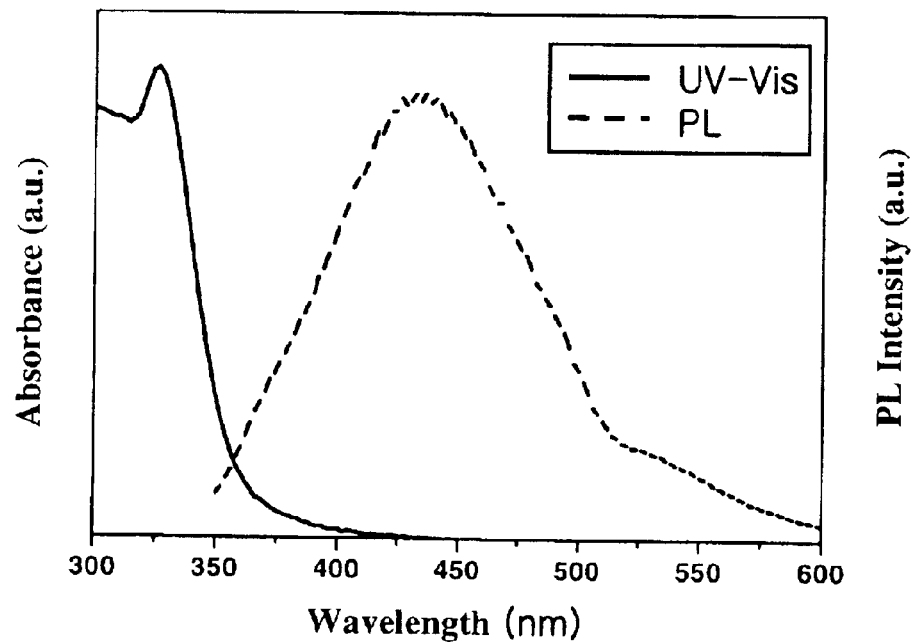

FIGS. 1 and 3 show $^1$H NMR spectrum of monomer (M-3) and polymer (P-5) obtained in Examples 6 and 17. FIG. 2 shows an ultraviolet-visible (referred to as 'UV-Vis', hereinafter) of monomer (M-3) of Example 6. FIG. 4 shows a UV-Vis and a PL spectrum of polymer (P-5) obtained in Example 17.

The PL spectrum was measured as follows:

0.1 g of polymer (P-5) was dissolved in 5 ml of chloroform. This solution was filtered through a micro filter of 0.2 micron and spin-coated while adjusting the spinning rate so as to make the resulting thin film have a thickness of about 100 nm, thereby to prepare a polymer thin film. After the thin film was dried at room temperature, its UV-Vis spectrum was observed, and then a PL spectrum was observed at a wavelength where the UV-Vis spectrum exhibited a maximum value. The results are shown in FIG. 4.

Next, a most generally used EL element consisting of ITO/light-emitting layer/electrode was fabricated, and then its EL property was observed.

Figure 5:
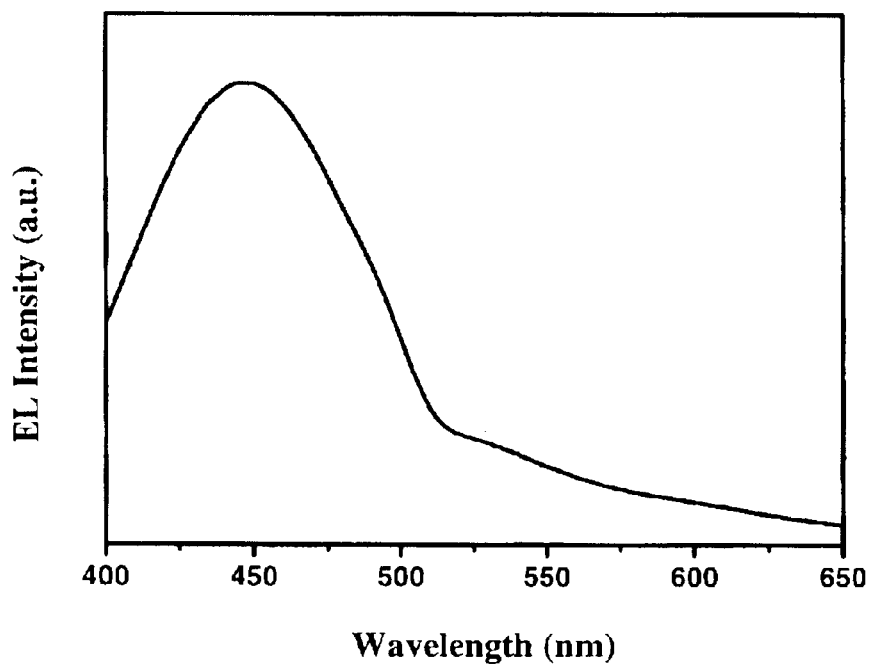

As the light-emitting layer, a polymer prepared in Examples as described above was used, or a material obtained by blending a commonly used polymer, for example, polyvinylcarbazole, polymethylmetacrylyrate, polystyrene, an epoxy resin or the like, with a polymer of the present invention in chloroform was used. As the electrode, aluminum was selected. The EL element was fabricated in the same manner as in fabricating a thin film for observing UV-Vis or the PL spectrum, that is, in a manner of vacuum-depositing aluminum onto the light-emitting layer which was spin-coated on the ITO glass substrate at a thickness of 100 nm. EL spectrum comprising a material in which polyvinylcarbazole was blended with the polymer (P-5) are shown in FIG. 5.

As so far described, the fluorene compounds and polymers thereof of the present invention can be applied to a LED, an EL element. Besides, as the fluorene compound and polymers thereof of the present invention have photo and electrical activities, and therefore, exhibit PL properties, nonlinear optical properties, photo and electric conductivity and the like, they are expected to be applied to an optical switch, a sensor, a module, a waveguide, a transistor, a laser, an optical absorbing substance, a polymer separator film, a dielectric substance and the like.

What is claimed is:

1. A fluorene compound represented by the following formula (1):

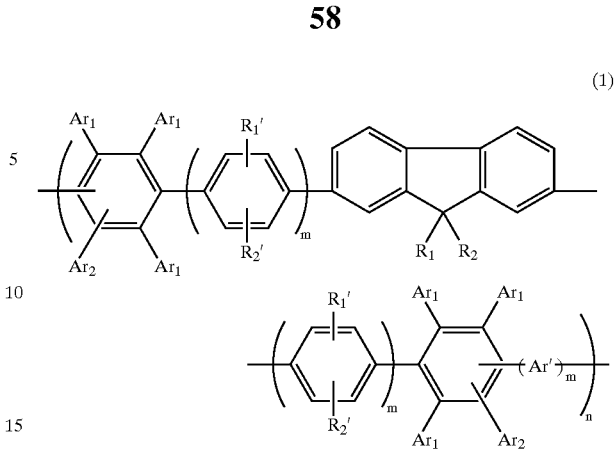

wherein, $R_1$, $R_2$, $R_1'$ and $R_2'$ are the same with or different from each other, and are substituents independently selected from the group consisting of hydrogen, $C_1$–$C_{22}$ aliphatic alkyl and alkoxy, $C_1$–$C_{22}$ alicyclic alkyl and alkoxy, $C_6$–$C_{18}$ aryl and aryloxy, alkyl and aryl derivatives of silicon, tin and germanium, and halogen atoms;

$Ar_1$ and $Ar_2$ are the same with or different from each other, and respectively represent hydrogen, trimethylsilyl, bromine, alkyl group or $C_6$–$C_{18}$ aromatic group including phenyl, naphtyl or derivatives thereof;

Ar' represents a substituent selected from the group consisting of aromatic and heterocyclic groups including phenylene, naphtalene, anthracene, fluorene, thiopene, pyrrole, pyridine, aryloxadiazole, triazole, arylamine, arylsilane and Ar' represents a substituent selected from the group consisting of aromatic and heterocyclic groups including phenylene, naphtalene, anthracene, fluorene, thiopene, pyrrole, pyridine, aryloxadiazole, triazole, arylamine, arylsilane and derivatives thereof; and m=0 or 1, and n=1.

2. The fluorene compound according to claim 1, wherein $R_1$, $R_2$, $R_1'$ and $R_2'$ are respectively selected from the group consisting of hydrogen, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, docodecyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphthyl, anthrancene and derivatives thereof, trimethylsilyl, triphenylsilyl, tributyltin, triethylgermanium, iodidine, bromine and chlrorine.

3. The fluorene compound according to claim 1, wherein Ar' is selected from the group consisting of the substituents having the following structures:

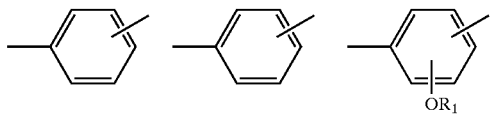

-continued

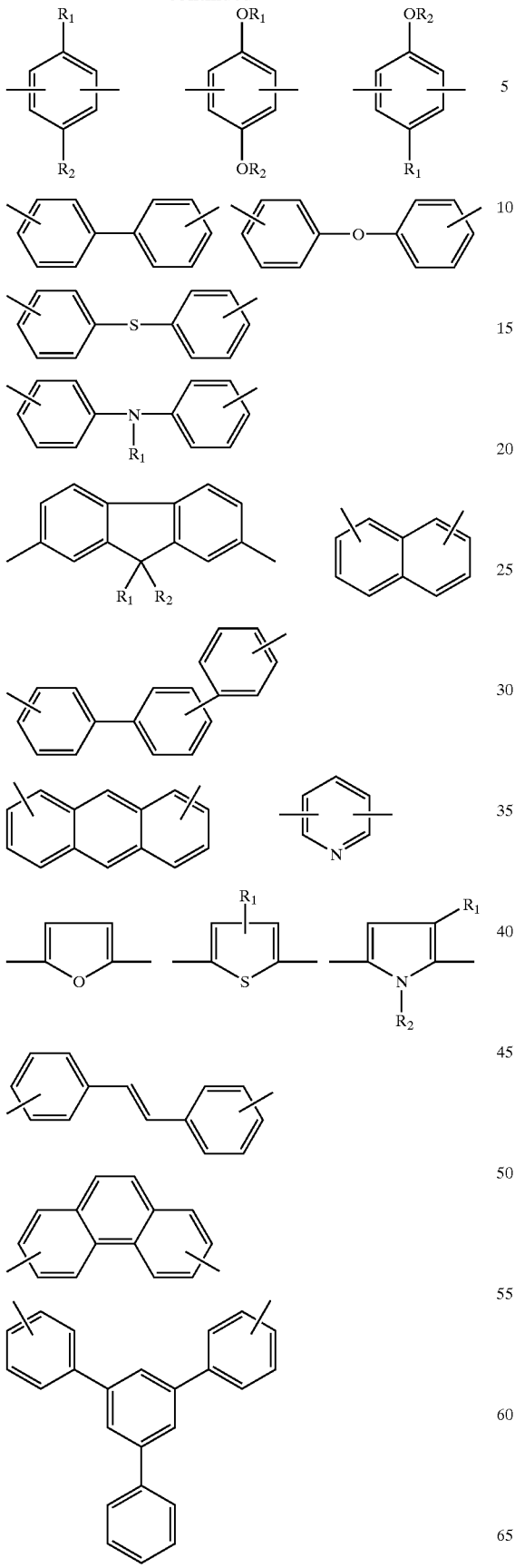

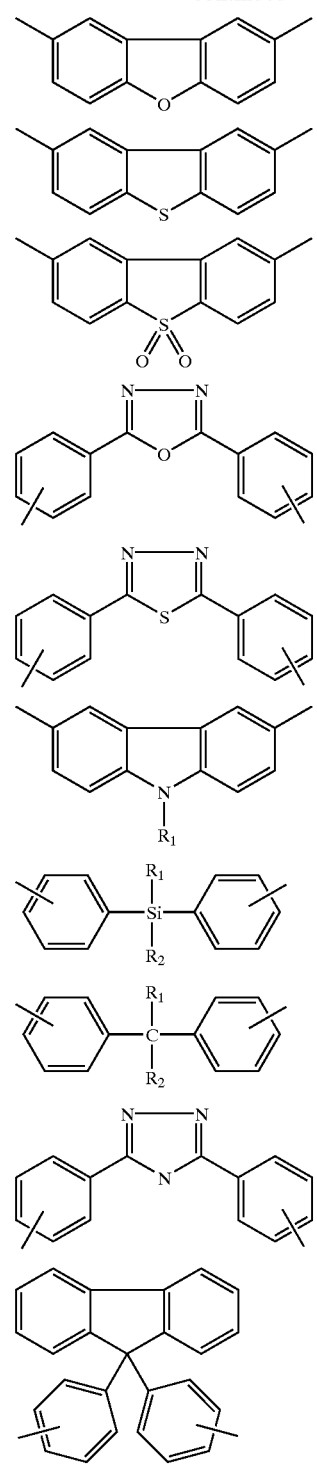

wherein, $R_1$ and $R_2$ are the same with or different from each other, and are substituents independently selected from the group consisting of hydrogen, $C_1$–$C_{22}$ aliphatic alkyl and alkoxy, $C_1$–$C_{22}$ alicyclic alkyl and alkoxy, $C_6$–$C_{18}$ aryl and aryloxy, alkyl and aryl derivatives of silicon, tin and germanium, and halogen atoms.

4. A fluorene group polymer represented by the following formula (1):

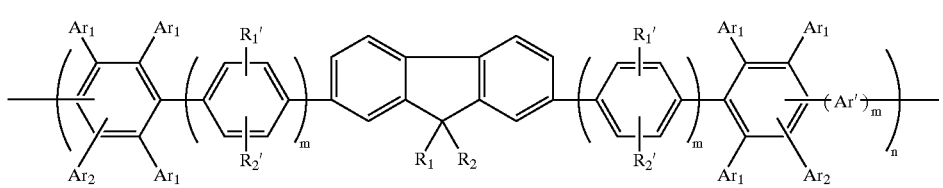

(1)

wherein, $R_1$, $R_2$, $R_1'$ and $R_2'$ are the same with or different from each other, and are substituents independently selected from the group consisting of hydrogen, $C_1$–$C_{22}$ aliphatic alkyl and alkoxy, $C_1$–$C_{22}$ alicyclic alkyl and alkoxy, $C_6$–$C_{18}$ aryl and aryloxy, alkyl and aryl derivatives of silicon, tin and germanium, and halogen atoms;

$Ar_1$ and $Ar_2$ are the same with or different from each other, and respectively represent hydrogen, trimethylsilyl, bromine, alkyl group or $C_6$–$C_{18}$ aromatic group including phenyl, naphtyl or derivatives thereof;

Ar' represents a substituent selected from the group consisting of aromatic and heterocyclic groups including phenylene, naphtalene, anthracene, fluorene, thiopene, pyrrole, pyridine, aryloxadiazole, triazole, arylamine, arylsilane and derivatives thereof; and m is 0 or an integer above 1, and n is an integer above 1.

5. The fluorene group polymer according to claim 4, wherein $R_1$, $R_2$, $R_1'$ and $R_2'$ are respectively selected from the group consisting of hydrogen, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, docodecyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphtyl, anthrancene and derivatives thereof, trimethylsilyl, triphenylsilyl, tributyltin, triethylgermanium, iodidine, bromine and chlrorine.

6. The fluorene group polymer according to claim 4, which is a product of a reaction between fluorene compounds having the following chemical formula (1) which are the same with or different from each other, or a polymerization product between a fluorene compound having the chemical formula (1) and other compound:

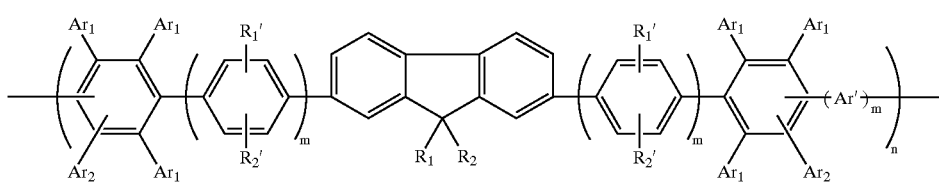

(1)

wherein, $R_1$, $R_2$, $R_1'$ and $R_2'$ are the same with or different from each other, and are substituents independently selected from the group consisting of hydrogen, $C_1$–$C_{22}$ aliphatic alkyl and alkoxy, $C_1$–$C_{22}$ alicyclic alkyl and alkoxy, $C_6$–$C_{18}$ aryl and aryloxy, alkyl and aryl derivatives of silicon, tin and germanium, and halogen atoms;

$Ar_1$ and $Ar_2$ are the same with or different from each other and respectively represent hydrogen, trimethylsilyl, bromine, alkyl group or $C_8$–$C_{18}$ aromatic group including phenyl, naphtyl or derivatives thereof;

Ar' represents a substituent selected from the group consisting of aromatic and heterocyclic groups including phenylene, naphtalene, anthracene, fluorene, thiopene, pyrrole, pyridine, aryloxadiazole, triazole, arylamine, arylsilane and derivatives thereof; and m=0 or 1, and n=1.

7. The fluorene group polymer according to claim 4, wherein n is an integer of 1 to 1000.

8. The fluorene group polymer according to claim 4, wherein Ar' is selected from the group consisting of the substituents having the following structures:

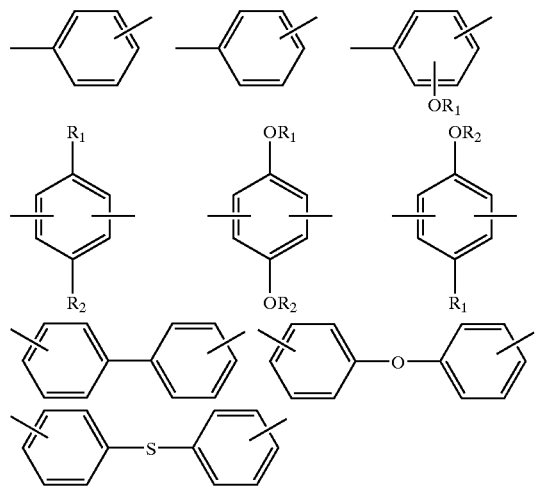

-continued

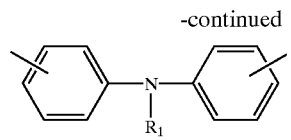

wherein, $R_1$ and $R_2$ are the same with or different from each other, and are substituents independently selected from the group consisting of hydrogen, $C_1$–$C_{22}$ aliphatic alkyl and alkoxy, $C_1$–$C_{22}$ alicyclic alkyl and alkoxy, $C_6$–$C_{18}$ aryl and aryloxy, alkyl and aryl derivatives of silicon, tin and germanium, and halogen atoms.

9. The fluorene group polymer according to claim 4, a homopolymer in which a monomer repeat unit is the same, or a copolymer in which the monomer repeat units of the polymer are different from each other.

10. An EL element comprising a fluorene group polymer according to claim 4 as a light-emitting layer.

11. The EL element according to claim 10, which consists of anode/light-emitting layer/cathode, anode/hole transport layer/light-emitting layer/electron transport layer/cathode or anode/hole injection layer/hole transport layer/light-emitting layer/electron transport layer/electron injection layer/cathode.

12. The EL element according to claim 11, wherein the light-emitting layer is prepared by cross-linking the fluorene group polymer with heat and/or light.

13. The EL element according to claim 11, wherein the light-emitting layer is prepared by blending the fluorene group polymer according to claim 4 with a polymer selected from the group consisting of thermoplastic polymers including polyvinylcarbazole, poly(1,4-hexyloxy-2,5-phenylenevinylene), poly(3-hexyl-thiopene), polymethylmetacrylate, polyacrylate, polystyrene, polycarbonate, polyvinylchloride, polyethylene, polypropylene, polyacrylonitrile, polyvinyl-pyrrolydone, polyvinylalcohol, polyvinylacetate, polyvinylbutylal, polyvinylamine, polycaprolactone, polyethyleneterephtalate, polybutyleneterephtalate, polyurethane, ABS, polysulfone and polyvinylfluoride, and commonly used polymers including acetal, polyamide, polyimide, polyester, alkid, urea, furan, nylon, melamine, phenol, silicone and epoxy.

* * * * *